US007760810B2

(12) United States Patent
Koga et al.

(10) Patent No.: US 7,760,810 B2
(45) Date of Patent: Jul. 20, 2010

(54) RECEIVER AND METHOD FOR DIGITAL MULTI CARRIER TRANSMISSION

(75) Inventors: Hisao Koga, Chikushi-gun (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1288 days.

(21) Appl. No.: 10/869,034

(22) Filed: Jun. 17, 2004

(65) Prior Publication Data
US 2005/0008086 A1    Jan. 13, 2005

(30) Foreign Application Priority Data
Jun. 18, 2003    (JP)    ............... P2003-173202

(51) Int. Cl.
*H04K 1/10*    (2006.01)
(52) U.S. Cl. ............... 375/260; 327/77; 327/156; 375/355; 375/376
(58) Field of Classification Search ............... 327/156; 370/203, 342, 350, 529; 375/260, 270, 232, 375/376, 355; 398/72
See application file for complete search history.

(56) References Cited

U.S. PATENT DOCUMENTS

| | | | | |
|---|---|---|---|---|
| 4,829,258 | A * | 5/1989 | Volk et al. | ............... 327/156 |
| 5,479,447 | A * | 12/1995 | Chow et al. | ............... 375/260 |
| 5,497,398 | A | 3/1996 | Tzannes et al. | |
| 5,581,585 | A * | 12/1996 | Takatori et al. | ............... 375/376 |
| 5,631,610 | A | 5/1997 | Sandberg et al. | |
| 5,635,864 | A * | 6/1997 | Jones | ............... 327/77 |
| 5,636,246 | A | 6/1997 | Tzannes et al. | |
| 5,995,539 | A | 11/1999 | Miller | |
| 6,101,230 | A * | 8/2000 | Chun et al. | ............... 375/355 |
| 6,473,409 | B1 | 10/2002 | Malvar | |
| 6,487,574 | B1 | 11/2002 | Malvar | |
| 6,496,795 | B1 | 12/2002 | Malvar | |
| 6,532,256 | B2 | 3/2003 | Miller | |

(Continued)

FOREIGN PATENT DOCUMENTS

FR    2 800954    5/2001

(Continued)

OTHER PUBLICATIONS

International Search Report dated Oct. 19, 2004.

(Continued)

*Primary Examiner*—David C Payne
*Assistant Examiner*—Adolf Dsouza
(74) *Attorney, Agent, or Firm*—Dickinson Wright PLLC

(57) ABSTRACT

A receiving apparatus and method for compensating a clock-inconsistency between a transmitter and a receiver for a digital wavelet multi-carrier transmission. First and second wavelet transforms of received data are performed to output first and second transformed data and then a complex data generator generates the complex data by defining the first transformed data as in-phase components of complex information and the second transformed data as orthogonal components of the complex information and the complex data is output. Subsequently, an equalizer equalizes the complex data and outputs an equalized complex data a clock-inconsistency compensator compensates A clock-inconsistency between a receiver and a transmitter by using a result of a decision and the equalized complex data, and outputs a compensated complex data. A decision unit decides the compensated complex data, and outputs a result of the decision.

24 Claims, 23 Drawing Sheets

U.S. PATENT DOCUMENTS

| | | | |
|---|---|---|---|
| 6,952,441 | B2 | 10/2005 | Peeters |
| 7,058,002 | B1 | 6/2006 | Kumagai |
| 2001/0033547 | A1* | 10/2001 | Izumi .......................... 370/203 |
| 2003/0156014 | A1 | 8/2003 | Kodama |
| 2004/0057529 | A1 | 3/2004 | Koga |
| 2006/0203897 | A1 | 9/2006 | Kodama |
| 2007/0076809 | A1 | 4/2007 | Koga |
| 2009/0110101 | A1 | 4/2009 | Koga |
| 2009/0135932 | A1 | 5/2009 | Kodama |

FOREIGN PATENT DOCUMENTS

| | | |
|---|---|---|
| JP | 11252031 | 9/1999 |
| JP | 11275165 | 10/1999 |
| JP | 2001 298439 | 10/2001 |
| JP | 2001-313624 | 11/2001 |
| JP | 2003-218831 | 7/2003 |
| JP | 2004-166217 | 6/2004 |
| WO | 9707619 | 2/1997 |
| WO | 01/35561 | 5/2001 |
| WO | 2004 049662 | 6/2004 |

OTHER PUBLICATIONS

Cheong K-W et al.: "Discrete Wavelet Transforms in Multi-Carrier Modulation" IEEE Globecom 1998, The Bridge to Global Integration, Sydney, Nov. 8-12, 1998, IEEE Global Telecommunications Conference, New York, vol. 5, pp. 2794-2799, XP000801553, ISBN: 0-7803-4985-7.

Sandberg S D et al.: "Overlapped Discrete Multitone Modulation for High Speed Copper Wirecommunications" IEEE Journal on Selected Areas in Communications, IEEE Inc. New York, vol. 13, No. 9, Dec. 1, 1995 pp. 1571-1585, XP000543156, ISSN: 0733-8716.

Japanese Office Action dated Nov. 22, 2006 with English translation.

M. C. Sun, et al. "Power-Line Communication using DWMT Modulation," 2002 IEEE International Symposium on Circuits and Systems, vol. 4, XP002271367, pp. 493-496, May 26-29, 2002.

European Office Action dated May 30, 2006.

"Signal Processing with Lapped Transforms"; 1992 Artech House, Inc.; Henrique S. Maivar; Chapter 5. Modulated Lapped Transforms; pp. 204-209 and pp. 214-217.

J. Alhava, et al., "Adaptive Sine-Modulated/Cosine-Modulated Filter Bank Equalizer for Transmultiplexers," European Conference on Circuit Theory and Design, Espoo, Finland, Aug. 28-31, 2001, pp. 337-340.

A. Viholainen, et al., "Implementation of Parallel Cosine and Sine Modulated Filter Banks for Equalized Transmultiplexer Systems," Telecommunications Laboratory, Tampere University of Technology, Tampere, Finland, IEEE, 2001, pp. 3625-2628.

A. Viholainen, et al., "Complex Modulated Critically Sampled Filter Banks Based on Cosine and Sine Modulation," Institute of Communications Engineering, Tampere University of Technology, Tampere, Finland, IEEE, 2002, pp. 833-836.

J. Alhava, et al. "Exponentially-Modulated Filter Bank-Based Transmultiplexer," Tampere University of Technology, Institute of Communications Engineering, Tampere, Finland, IEEE, 2003, pp. 233-236.

J. Alhava et al., "Efficient Implementation of Complex Exponentially-Modulated Filter Banks," Tampere University of Technology, Institute of Communications Engineering, Tampere, Finland, 2003, pp. 157-160.

Y. Yang, et al., "DSP Implementation of Low-Complexity Equalizer for Multicarrier Systems," Institute of Communications Engineering, Tampere University of Technology, IEEE, 2003, pp. 271-274.

A. Viholainen et al. "Alternative Subband Signal Structures for Complex Modulated Filter Banks with Perfect Reconstruction," Institute of Communications Engineering, Tampere University of Technology, Tampere, Finland, IEEE, 2004, pp. 525-528.

Japanese Office Action dated Nov. 17, 2009 with English Translation thereof.

E. Okamoto, "A Study of Multi-Carrier Modulation Method Using Orthogonal Wavelets," Technical Report of IEICE, IEICE, Sep. 1997, vol. 97, No. 266, pp. 9-14.

* cited by examiner

FIG. 29

| SYMBOL FOR SYNCHRONIZATION | SYMBOL FOR EQUALIZATION | SYMBOL FOR INFORMATION |
|---|---|---|

… 1 …

RECEIVER AND METHOD FOR DIGITAL MULTI CARRIER TRANSMISSION

BACKGROUND OF THE INVENTION

1. Field of the Invention

The present invention relates to a receiving apparatus and method employing a multi-carrier transmission method utilizing real coefficient wavelet filter banks (Digital Wavelet Multi-Carrier transmission method, which is hereinafter called "DWMC transmission method").

2. Description of the Related Art

The transmission method involving digital modulation and demodulation processes utilizing real coefficient wavelet filter banks is a type of multi-carrier modulation method in which a plurality of digital modulated waves are synthesized from real coefficient filter banks to generate a transmission signal. In the method, PAM (Pulse Amplitude Modulation) is used as a method for modulating each carrier.

A data transmission method according to the DWMC transmission method will be described with reference to FIGS. 26 to 29.

As shown in FIG. 26, each subcarrier has an impulse response, and impulse responses of each of the plurality of subcarriers are transmitted in an overlapping relationship with each other. As shown in FIG. 27, each transmission symbol is formed by a time waveform that is a combination of impulse responses of a plurality of subcarriers.

The spectrum diagram shown in FIG. 28 illustrates an example of a transmitted spectrum according to the DWMC transmission method. A transmission frame (shown in FIG. 29) is formed by several tens to several hundreds of transmission symbols according to the DWMC transmission method. This transmission frame includes a symbol for a transmission of an information data, a symbol for a frame synchronization, and a symbol for an equalization.

Since a clock of a receiver is not exactly consistent with a clock of a transmitter in multi-carrier communications, receiving quality of the receiver may degrade because a bit error rate may rise in the receiver. The insertion of a pilot-carrier in carriers has been considered as a method to compensate for the clock-inconsistency. However, the usability of the frequency will degrade in this case. Furthermore, a method to compensate for the clock-inconsistency between the transmitter and the receiver may not have been established in the DWMC transmission method.

SUMMARY OF THE INVENTION

The present invention is made in view of the above-mentioned problems. An object of the present invention is to provide a receiving apparatus and method which can compensate for the clock-inconsistency between the transmitter and the receiver in the DWMC transmission method without using the pilot-carrier.

According to the invention, first and second wavelet transforms of received data are performed to output first and second transformed data and then a complex data generator generates the complex data by defining the first transformed data as in-phase components of complex information and the second transformed data as orthogonal components of the complex information and the complex data is output. Subsequently, an equalizer equalizes the complex data and outputs an equalized complex data. A clock-inconsistency compensator compensates a clock-inconsistency between a receiver and a transmitter by using a result of a decision and the equalized complex data, and outputs a compensated complex data. A decision unit decides the compensated complex data, and outputs a result of the decision.

The invention provides a receiving apparatus and method which can compensate for the clock-inconsistency between the transmitter and the receiver in the DWMC transmission method without using a pilot carrier.

BRIEF DESCRIPTION OF THE DRAWINGS

FIG. 29 is a schematic frame diagram showing an example of a configuration of a transmitted frame according to the DWMC transmission method;

DETAILED DESCRIPTION OF THE PREFERRED EMBODIMENTS

Preferred embodiments of the invention will be described with reference to FIGS. 1 through 31.

First Embodiment

Figure 1:
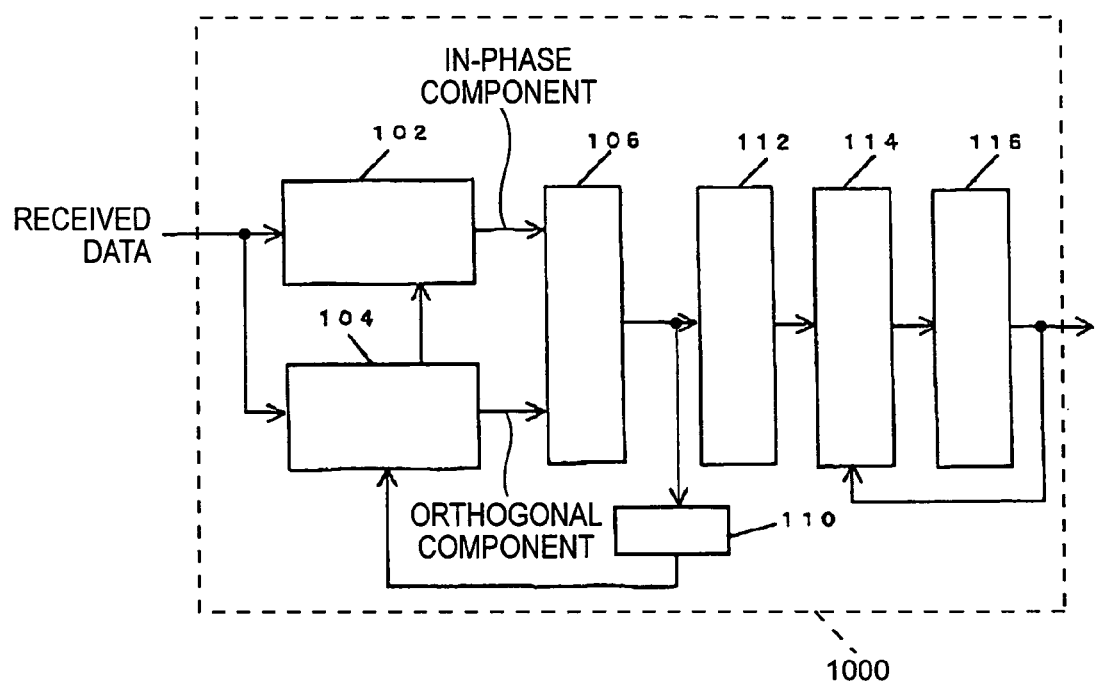
FIG. 1 is a block diagram of a receiving apparatus according to a first embodiment of the invention.

In FIG. 1, a receiver 1000 includes a first wavelet transformer 102, a second wavelet transformer 104, a complex data generator 106, a synchronization circuit 110, an equalizer 112, a clock-inconsistency compensator 114 and a decision unit 116. A controller (not shown in Figs.) controls the first wavelet transformer 102, the second wavelet transformer 104, the complex data generator 106, the synchronization circuit 110, the equalizer 112, the clock-inconsistency compensator 114 and the decision unit 116 of the receiver 1000. An IC (integrated circuit) chip is used as the first wavelet transformer 102, the second wavelet transformer 104, the complex data generator 106, the synchronization circuit 110, the equalizer 112, the clock-inconsistency compensator 114 and the decision unit 116 of the receiver 1000. A FPGA (field programmable gate array) or an ASIC (application specific integrated circuit) is preferably used as the IC chip. Furthermore, it may be possible to use a plurality of IC chips for the functional blocks such as the first wavelet transformer 102, the second wavelet transformer 104, the complex data generator 106, the synchronization circuit 110, the equalizer 112, the clock-inconsistency compensator 114, and the decision unit 116 of the receiver 1000.

The first wavelet transformer 102 receives data, performs a wavelet transform to the received data, and then outputs first wavelet-transformed data to the complex data generator 106. The first wavelet transformer includes M real coefficient wavelet filters (M is a positive integer) which are orthogonal with respect to each other. The second wavelet transformer 104, which is orthogonal to the first wavelet transformer 102, receives data, performs a wavelet transform to the received data, and then outputs second wavelet-transformed data to the complex data generator 106. The second wavelet transformer includes M real coefficient wavelet filters (M is a positive integer) which are orthogonal with respect to each other.

The complex data generator 106 generates complex data from the first and second wavelet-transformed data, and outputs the complex data to the synchronization circuit 110 and the equalizer 112.

The synchronization circuit 110 estimates a synchronization timing from the complex data. The equalizer 112 equalizes a waveform of the complex data distorted in a data transmission line. The clock-inconsistency compensator 114 compensates for a clock-inconsistency between the transmitter and the receiver utilizing a decision data decided by the decision unit 116 and the equalized complex data equalized by the equalizer 112. The decision unit 116 decides whether a data used in the communication exists or not in the compensated complex data. In the present embodiment, the clock-inconsistency compensator 114 operates when the result of the decision indicates that the data used in the communication exists in the data outputted from the compensator 114.

Figure 2:
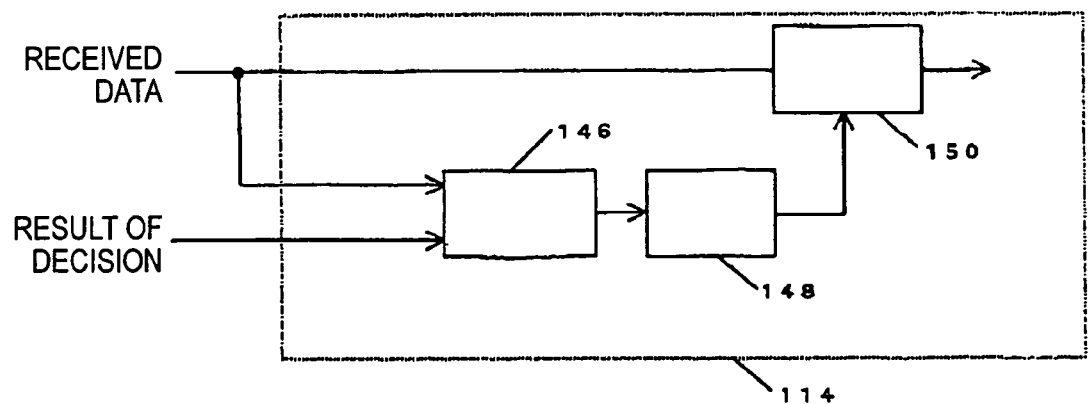
FIG. 2 is a block diagram of a clock-inconsistency compensator according to a first embodiment of the invention.

Next, the configuration of the clock-inconsistency compensator 114 will be described in detail. As shown in FIG. 2, the clock-inconsistency compensator 114 includes a phase-deviation calculator 146, an average sample-deviation calculator 148 and a phase-compensator 150 in the present embodiment. The phase-deviation calculator 146 calculates a phase-deviation of each of the subcarriers, which is caused by the clock-inconsistency, utilizing the complex data and the result of the decision. The average sample-deviation calculator 148 calculates an average sample-deviation of a time data from the phase-deviation of each of the subcarriers. The phase-compensator 150 compensates for a phase of each of the subcarriers utilizing a sample deviation.

An operation of the receiver 1000 having such a configuration will now be described with reference to FIGS. 1 and 2.

First, a wavelet transform is performed on the received data using the first and second wavelet transformer 102 and 104. Next, the first and second wavelet transformers 102 and 104 output the first and second wavelet-transformed data, respectively, to the complex data generator 106. The complex data generator 106 generates complex data from real parts (in-phase components) of the complex data and imaginary parts (orthogonal components) of the complex data. The real parts are the first wavelet-transformed data received from the first wavelet transformer 102 and the imaginary parts are the second wavelet-transformed data received from the second wavelet transformer 102. Subsequently, the complex data generator 106 outputs the complex data to the synchronization circuit 110 and the equalizer 112.

Next, the synchronization circuit 110 estimates a synchronization timing using the complex data, and feeds back an information related to the synchronization timing to the first and second wavelet transformer 102 and 104. The equalizer 112 equalizes a waveform of the complex data distorted in a data transmission line, and outputs the equalized complex data to the clock-inconsistency compensator. In the clock-inconsistency compensator 114, the phase-deviation calculator 146 calculates each phase-deviation of the subcarriers, which is caused by the clock-inconsistency between the transmitter and the receiver 1000, utilizing the equalized complex data outputted from the equalizer 112 and the result of the decision outputted from the decision unit 116, and the phase-deviation calculator 146 outputs the phase-deviation of each of the subcarriers to the average sample-deviation calculator 148. The average sample-deviation calculator 148 calculates an average sample-deviation of a time data from each phase-deviation between the subcarriers, and outputs the average sample-deviation of the time data to the phase compensator 150. The phase compensator 150 compensates for a clock-inconsistency between the transmitter and the receiver 1000 by compensating each phase of the subcarriers corresponding to the average sample-deviation of the time data. Next, the clock-inconsistency compensator 114 outputs the compensated complex data to the decision unit 116. The decision unit 116 decides whether a data used in the communication exists or not in the compensated complex data, and feeds back a result of a decision to the clock-inconsistency compensator 114.

An algorithm of the clock-inconsistency compensator will be described with reference to FIGS. 3 and 4.

Figure 3:
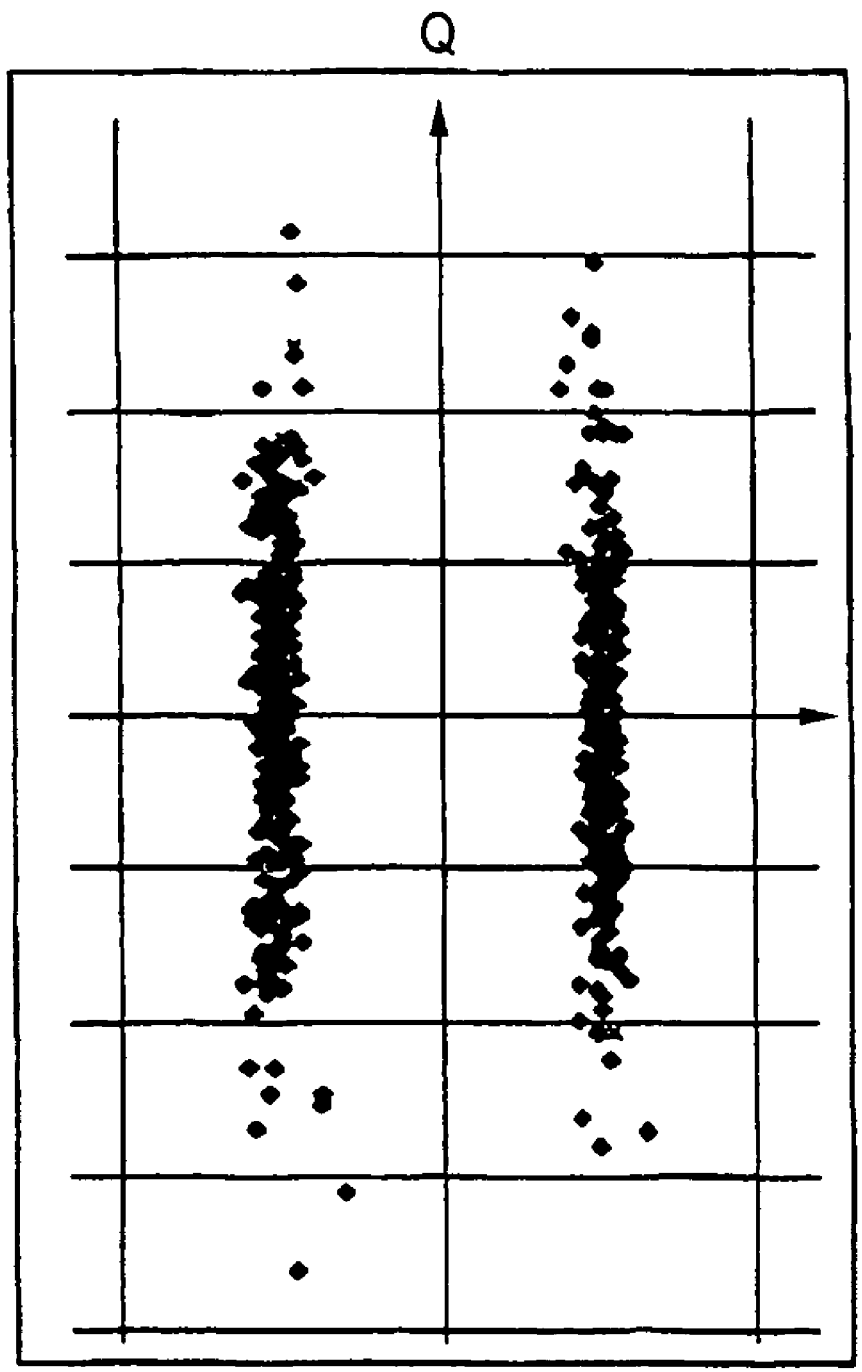
FIG. 3 is a diagram showing an example of a distribution of complex data treated with an equalizer with orthogonal coordinates in a case that the clock-inconsistency does not exist.
Figure 4:
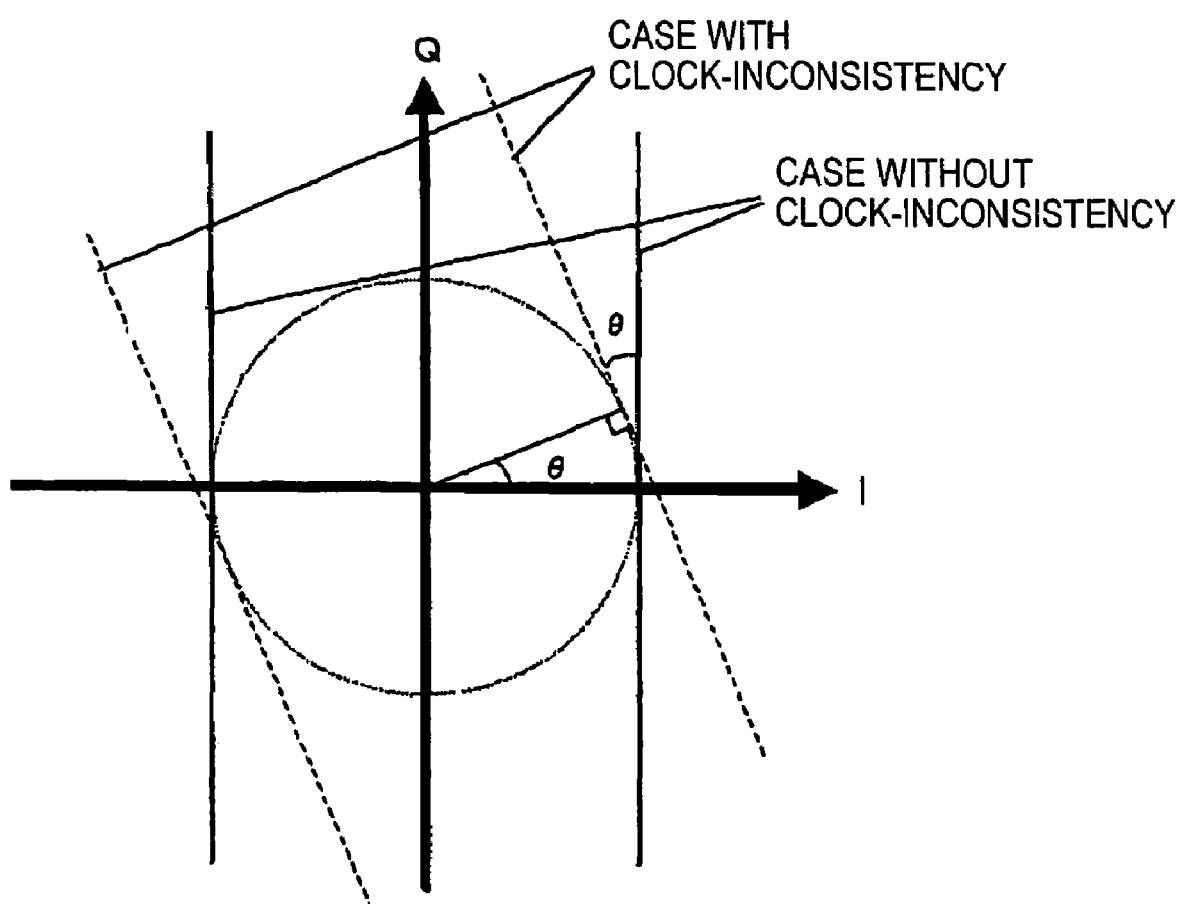
FIG. 4 is a schematic diagram showing an example of a distribution of complex data treated with a equalizer with orthogonal coordinates in cases that a clock-inconsistency exists and does not exist.

For an environment in which a clock of the transmitter is consistent with a clock of the receiver, the equalized complex data has a distribution as shown in FIG. 3 with Cartesian coordinates when 2-PAM is used as a primary modulation. When the clock-inconsistency does not exist, the equalized complex data has a distribution of two straight lines "X1" and "X2" orthogonal to the I-axis, as shown in FIG. 4. Cross points between the two lines and the I-axis indicate the decision data, the cross points being +1 and −1, respectively, in this example. However, the two lines are not orthogonal to the I-axis and rotate along a circumference of a circle when the clock-inconsistency exists in a data communication, as shown by the two dashed straight lines in FIG. 4. The diameter of the circle shows a distance between two decision data.

Figure 5:
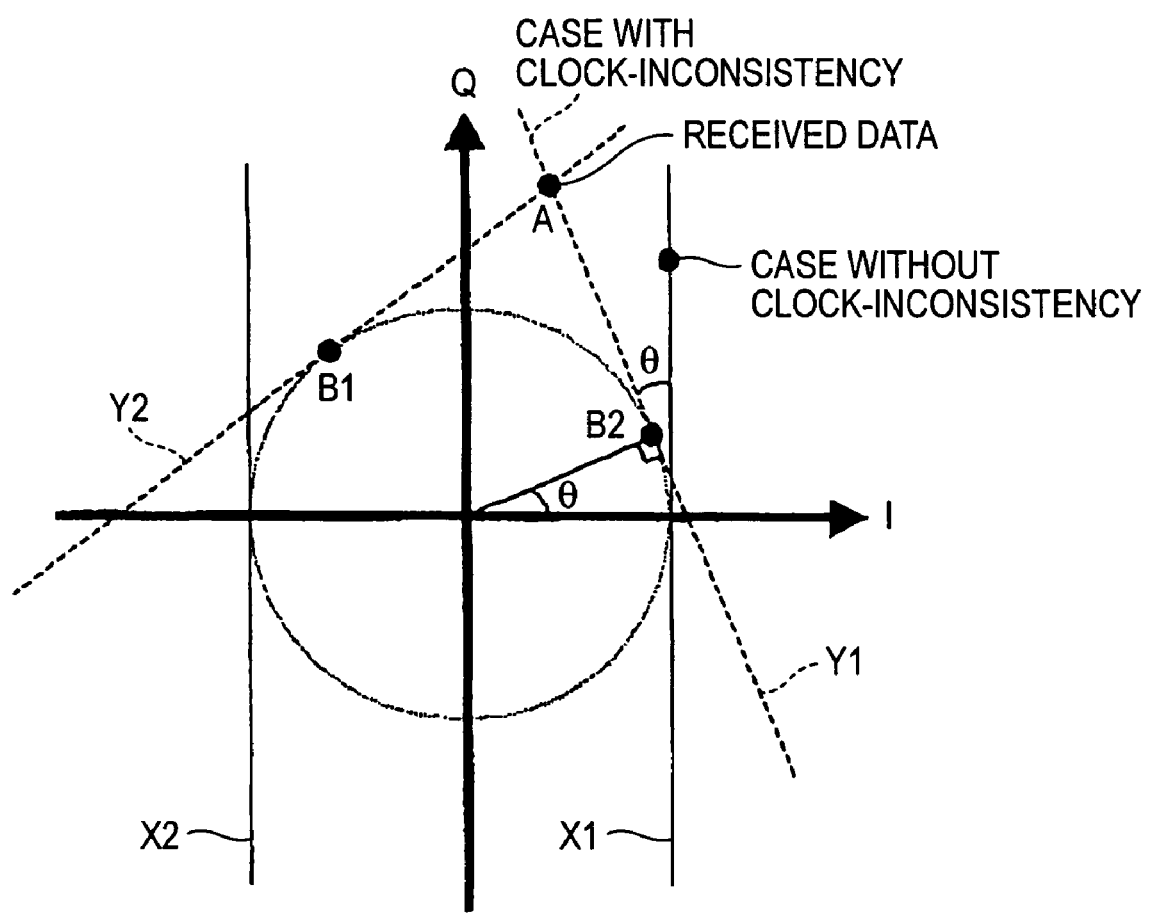
FIG. 5 is a schematic diagram showing an example of how to obtain a phase-deviation between subcarriers that is caused by a clock-inconsistency between a transmitter and a receiver according to a first embodiment of the invention.

An example of the phase-deviation calculator 146 is shown in FIG. 5. When an equalized complex data locates "A" with Cartesian coordinates, two tangential lines "Y1" and "Y2" from "A" contact with the circle at two contact points "B1" and "B2". For example, when the result of the decision of "A" is 1, "B2" is the right point because "B2" is closer than "B1". An angle formed by the I-axis and a straight line passing through the coordinate origin "O" and "B2" defines as "θ". When the clock-inconsistency exists, the tangential line "Y1" indicates the distribution of the equalized complex data as shown in FIG. 5 and the "θ" indicates a phase-deviation according to the clock-inconsistency between the receiver and the transmitter. The angle of "θ" also indicates the angle formed by the straight lines "X1" and "Y1", that is, it indicates the rotational angle of "X1" rotated along a circumference of the circle.

The phase-deviation calculator 146 calculates a phase-deviation of each of the subcarriers utilizing the algorithm. Next, the average sample-deviation calculator 148 calculates an sample-deviation of a time data (τn: τn=φn/2πfn) utilizing each phase-deviation between the subcarriers (φn) outputted from the phase-deviation calculator 146 and a frequency of each subcarrier (fn). "n" is the subcarrier number. Next, the average sample-deviation calculator 148 calculates an average sample-deviation (τavg) from a synchronization timing of the time data by dividing the number of subcarriers into the total of the sample-deviation of the time data. Subsequently, the phase compensator 150 calculates the phase deviation of each subcarrier (φn avg) utilizing the formula:φn avg=2πfn τavg and compensates for the phase of each subcarrier with the phase deviation of each subcarrier (φn avg).

The above-described configuration makes it possible to compensate for the clock-inconsistency between the receiver and the transmitter without using a pilot carrier. In addition, the above-described configuration also makes it possible to prevent degradation of the usability of the frequency.

While a particular configuration of the clock-inconsistency compensator 114 is described in the present embodiment for illustration purposes, the invention is not to be considered limited to this particular configuration. For example, the invention can be used in any system for compensating a clock-inconsistency between a receiver and a transmitter without using a pilot carrier. Furthermore, although 2PAM is used as one method for modulating each carrier in the present embodiment, 4PAM, 8PAM or more can also be used as other methods for modulating each carrier instead of 2PAM.

Second Embodiment

A receiving apparatus of the second embodiment has the same configurations with the receiver of the first embodiment. However, an algorithm of the clock-inconsistency compensator 114 of this embodiment is different from the algorithm described in the first embodiment. Accordingly, the algorithm of the clock-inconsistency compensator 114 will be described in detail in the present embodiment.

Figure 6:
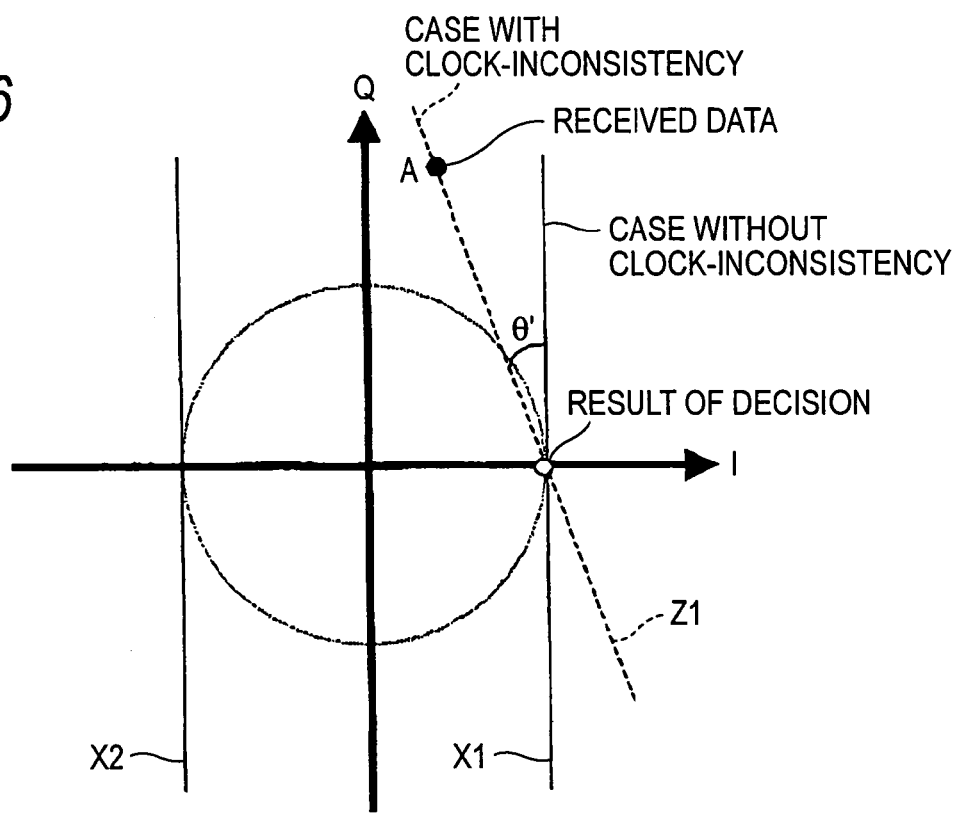
FIG. 6 is a schematic diagram showing an example of how to obtain a phase-deviation between subcarriers that is caused by a clock-inconsistency between a transmitter and a receiver according to a second embodiment of the invention.

An example of the phase-deviation calculator 146 is shown in FIG. 6. When the clock-inconsistency does not exist, the equalized complex data has a distribution, indicated by two straight lines "X1" and "X2" orthogonal to the I-axis, as shown in FIG. 6. When an equalized complex data locates "A" with Cartesian coordinates, the result of the decision of "A" is 1. An angle formed by "X1" and a straight line passing through "A" and the result of the decision "1" defines as "θ". The angle of "θ" indicates a phase-deviation according to the clock-inconsistency between the receiver and the transmitter.

The above-described configuration makes it possible to simplify the algorithm in the phase-deviation calculator. In particular, the smaller the phase deviation is, the more effective the above-described configuration is.

Third Embodiment

A receiver of the third embodiment has the same configuration with the receiver of the first and second embodiments. However, an algorithm of the clock-inconsistency compensator 114 is different from the algorithm described in the first and second embodiments. Accordingly, the algorithm of the clock-inconsistency compensator 114 will be described in detail in the present embodiment with reference to FIG. 7.

Figure 7:
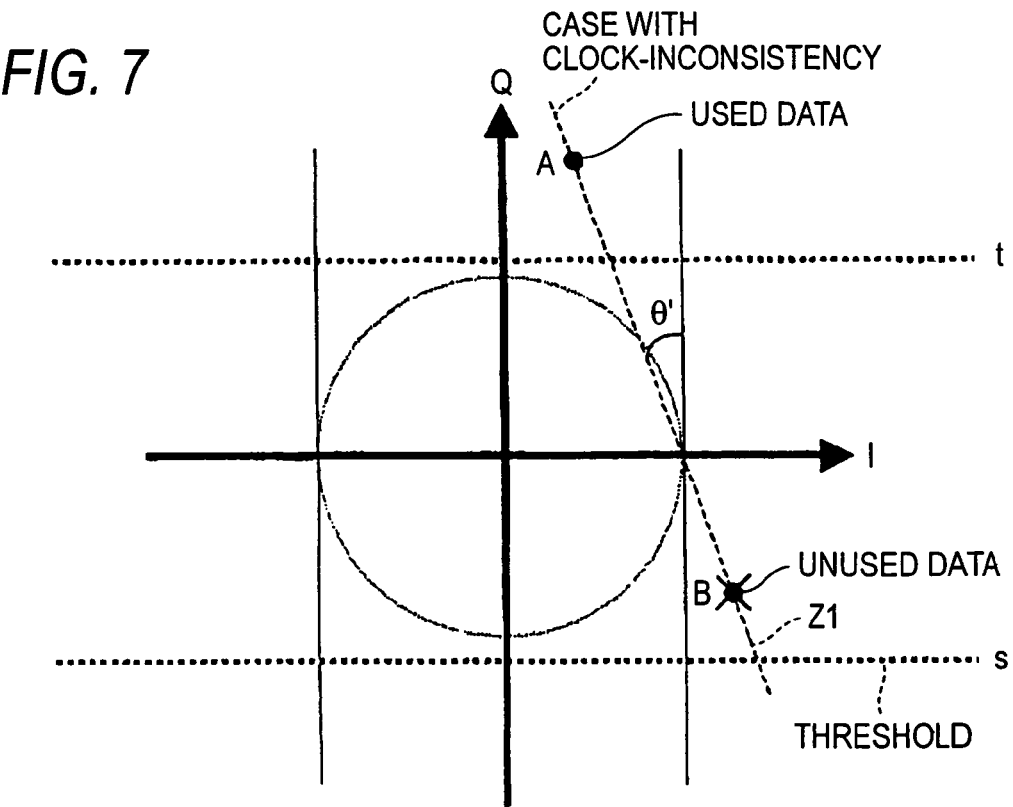
FIG. 7 is a schematic diagram showing an example of how to obtain a phase-deviation between subcarriers that is caused by a clock-inconsistency between a transmitter and a receiver according to a third embodiment of the invention.

As shown in FIG. 7, though a calculation of the phase-deviation calculator 146 is similar to the calculation described in the second embodiment, data used in this embodiment is different from the data used in the second embodiment. In this embodiment, a memory (not shown in FIG. 7) which stores a threshold for orthogonal components of the complex data is placed in the phase-deviation calculator 146. In this embodiment, the number of the threshold is two, and the values of the thresholds are t and s as shown in FIG. 7. When the phase-deviation according to the clock-inconsistency between the receiver and the transmitter is calculated by the equalized complex data and the result of the decision, a comparison is made between the threshold and the absolute value of the orthogonal component of "A" with Cartesian coordinates in the phase-deviation calculator 146. When the absolute value of the orthogonal component is equal to or larger than the threshold according to the comparison, the calculation described in the second embodiment is carried out.

Thus, the above-described configuration makes it possible to improve the accuracy of the calculation since when noise overlaps data, the data is rotated corresponding to strength of the noise. When the same noise overlap the data of "A" and the data of "C" respectively, the data of "A" moves to the data of "A'" while rotating an angle of "θ1" from the Q-axis and the data of "C" also moves to the data of "C'" with rotating angle of "θ2" from Q-axis. That is, because of the effect of the noise, the phase-deviation of both data increases. Also, the smaller the absolute value of data, the larger the phase-deviation of the data. Accordingly, by not using the data that are less than the threshold in the calculation of the phase-deviation, the effect of the noise can be suppressed in the calculation. Accordingly, the above-described configuration makes it possible to achieve the accurate operation of the receiver 1000.

Fourth Embodiment

A receiver of the fourth embodiment has the same configuration with the receiver of the second embodiment. However, an algorithm of the clock-inconsistency compensator 114 is different from the algorithm described in the second embodiment. Accordingly, the algorithm of the clock-inconsistency compensator 114 will be described in detail in the present embodiment with reference to FIG. 8.

Figure 8:
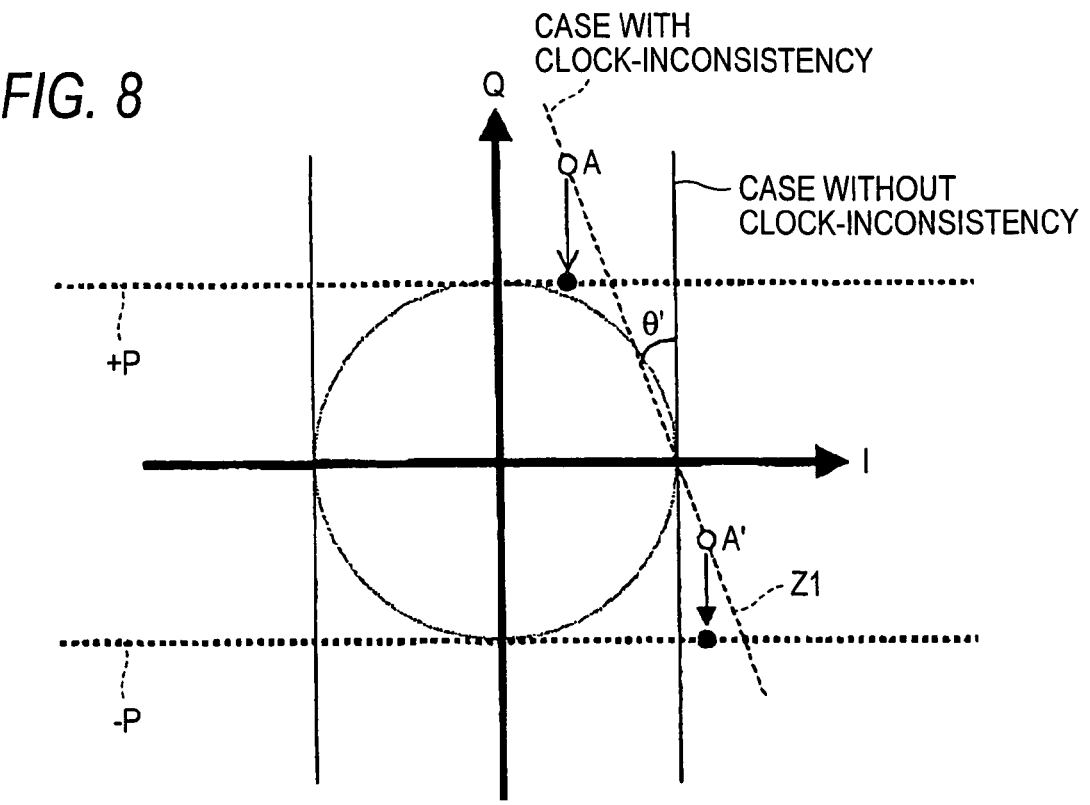
FIG. 8 is a schematic diagram showing an example of how to obtain a phase-deviation between subcarriers which is caused by a clock-inconsistency between a transmitter and a receiver according to a fourth embodiment of the invention.

As shown in FIG. 8, although a calculation of the phase-deviation calculator 146 is similar to the calculation described in the second embodiment, data utilized in this embodiment is different from the data utilized in the second embodiment. In the present embodiment, when a value of an orthogonal component of an equalized complex data is equal to zero or is positive, then the value of the orthogonal component of the equalized complex data is replaced with a fixed value of "+P" whatever the absolute value of the orthogonal component is. On the other hand, when a value of an orthogonal component of an equalized complex data is negative, then the value of the orthogonal component of the equalized complex data is replaced with another fixed value of "−P" whatever the absolute value of the orthogonal component is. For example, as "A" shown in FIG. 8 has a positive value of the orthogonal component, a replaced value is "+P". However, as "A'" shown in FIG. 8 has a negative value of the orthogonal component, a replaced value is "−P". It is preferable for p to be close to a mean value of the distribution of the data along the Q-axis. For example, a mean power of the orthogonal component of the equalized complex data can be used as "P".

Furthermore, although the orthogonal component of the equalized complex data is replaced with the fixed value of "+P" or "−P" using zero as a threshold in the present embodiment, the threshold can be selected for a value which is suitable for the receiver 1000.

Thus, the above-described configuration makes it possible to improve the accuracy of the calculation and simplify the calculation process in the receiver 1000 because there are only two values (+P or −P) of the Q-axis direction of all data. Accordingly, the configuration makes it possible to achieve an even more accurate and quick operation of the receiver 1000 compared with the second embodiment.

Fifth Embodiment

A receiver of the fifth embodiment has the same configurations with the receiver of the fourth embodiment. However, an algorithm of the clock-inconsistency compensator 114 is different from the algorithm described in the second embodiment. Accordingly, the algorithm of the clock-inconsistency compensator 114 will be described in detail in the present embodiment with reference to FIG. 9.

Figure 9:
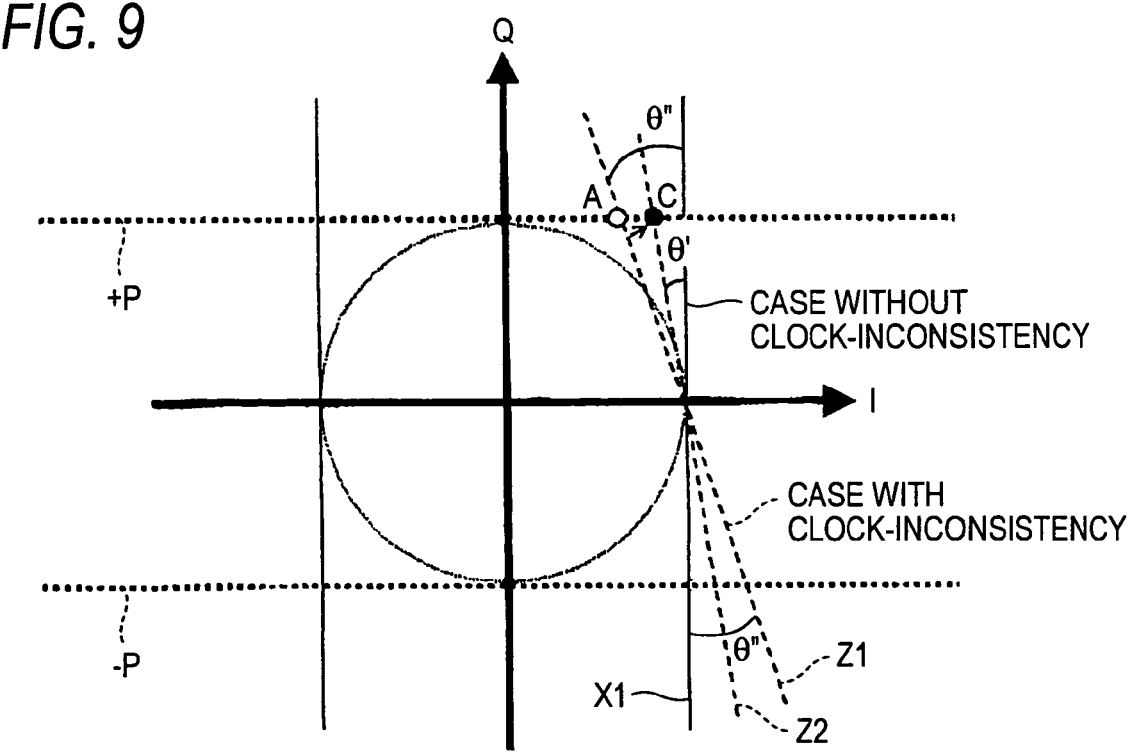
FIG. 9 is a schematic diagram showing an example of how to obtain a phase-deviation between subcarriers that is caused by a clock-inconsistency between a transmitter and a receiver according to a fifth embodiment of the invention.

As shown in FIG. 9, although a calculation of the phase-deviation calculator 146 is similar to the calculation described in the fourth embodiment, data utilized in this embodiment is limited to data for which a phase-deviation is equal to or less than a limit (the maximal value of phase-deviation). The limit of the phase-deviation is set in advance as a maximal phase-deviation angle of "θ" formed by the straight line of "X1" and the straight line "Z2" passing through a point of "C" and a point of the result of the decision "1".

When the phase-deviation according to the clock-inconsistency between the receiver and the transmitter is calculated by the equalized complex data and the result of the decision, as shown in FIG. 9, the data that have phase-deviation angles beyond the maximal phase-deviation angle of "θ" are considered as all located on the point of "C".

Thus, the above-described configuration makes it possible to improve the accuracy of the calculation in comparison with the fourth embodiment. Accordingly, the configuration makes it possible to achieve an accurate operation of the receiver.

Sixth Embodiment

A receiver of the sixth embodiment has the same configurations with the receiver of the fourth embodiment. However, an algorithm of the clock-inconsistency compensator 114 is different from the algorithm described in the second embodiment. Accordingly, the algorithm of the clock-inconsistency compensator 114 will be described in detail in the present embodiment with reference to FIG. 10.

In the present embodiment, the average sample-deviation calculator 148 calculates an average sample-deviation from synchronization timing of the time data by utilizing phase-deviations of each of the subcarriers. The average sample-deviation (shown in FIG. 10) multiplied positive integer is used as the average sample-deviation shown in the embodiment 4.

Thus, the above-described configuration makes it possible to improve the accuracy of the calculation compared with the fourth embodiment.

Seventh Embodiment

A receiver of the seventh embodiment has the same configurations with the receiver of the fourth embodiment. However, an algorithm of the clock-inconsistency compensator 114 is different from the algorithm described in the second embodiment. Accordingly, the algorithm of the clock-inconsistency compensator 114 will be described in detail In the present embodiment, the average sample-deviation calculator 148 calculates an average sample-deviation from synchronization timing of the time data by utilizing phase-deviations of each of the subcarriers. The average sample-deviation (shown in FIG. 10) multiplied positive integer is used as the average sample-deviation shown in embodiment 4. Further, the average sample-deviation calculator 148 changes the positive integer appropriately. Initially, the average sample-deviation calculator 148 sets the maximal value as an initial value. After starting the sample-deviation calculation, the average sample-deviation calculator 148 observes the average sample-deviation and changes the positive integer corresponding to an amount of the average sample-deviation.

Thus, the above-described configuration makes it possible to improve a resistance to noise compared with the fourth embodiment.

Eighth Embodiment

A receiver of the eighth embodiment has the same configurations with the receiver of the fourth embodiment except for the clock-inconsistency compensator 114. Accordingly, the algorithm of the clock-inconsistency compensator 114 will be described in detail in the present embodiment with reference to FIG. 11.

Figure 11:
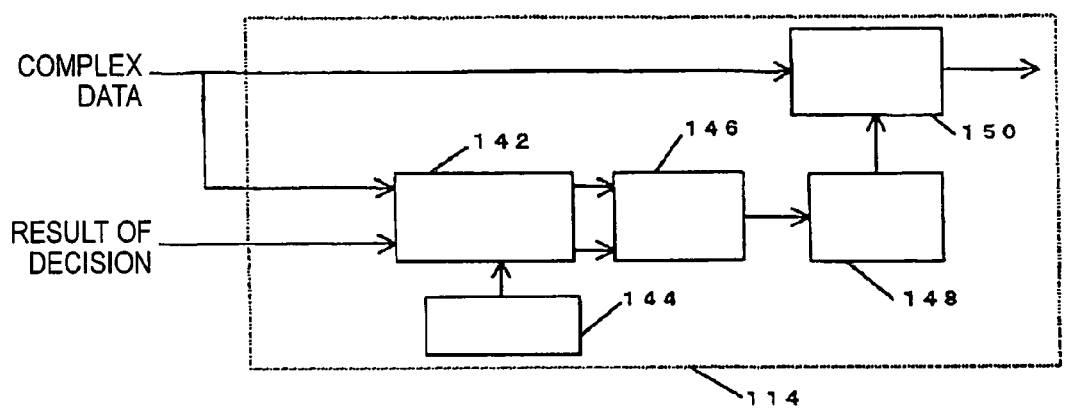
FIG. 11 is a block diagram of a receiving apparatus according to an eighth embodiment of the invention.

As shown in FIG. 11, the clock-inconsistency compensator 114 includes a subcarrier selector 142, a primary modulation table 144, the phase-deviation calculator 146, an average sample-deviation calculator 148 and a phase-compensator 150 in the present embodiment. The subcarrier selector 142 selects a subcarrier for compensating clock-inconsistency. The primary modulation table 144 is used for the selection of the subcarrier.

An operation of the receiver 1000 having such a configuration will now be described with reference to FIG. 11. The primary modulation table 144 stores a primary modulation type, such as 2PAM, 4PAM, 8PAM, and 16PAM, of each of the subcarriers, which is set in advance. For example, when a symbol consists of 512 subcarriers, the primary modulation table 144 stores 512 primary modulation types such that the first subcarrier is 2PAM, the second subcarrier is 16PAM, the third subcarrier is 4PAM, . . . , and the $512^{th}$ subcarrier is 8PAM. The primary modulation type is allotted in advance to each of the subcarriers according to a condition of a transmission channel, for example, a presence of noise between a transmitter and a receiver before the transmitter sends a data to the receiver. For example, when the condition of the transmission channel for a subcarrier is very good, 16PAM is used for the subcarrier as a primary modulation type. At the same time, when the condition of the transmission channel for another subcarrier is very bad, then 2PAM is used for the subcarrier as a primary modulation type. The subcarrier selector 142 selects a subcarrier that is used to compensate for a clock-inconsistency utilizing the primary modulation table 144. The phase-deviation calculator 146 calculates a phase-deviation caused by the clock-inconsistency using both the decision result of the subcarrier selected in the carrier selector 142 and the complex data output from the equalizer 112. The average sample-deviation calculator 148 calculates the average sample-deviation of the time data using the phase-deviation of the selected subcarrier. The phase compensator 150 compensates for the phase-deviation of each of the subcarriers using the average sample-deviation.

Thus, the above-described configuration makes it possible to improve the accuracy of the calculation because of using selected subcarriers for compensating clock-inconsistency. Accordingly, the configuration makes it possible to achieve accurate operation of the receiver.

Ninth Embodiment

Figure 12:
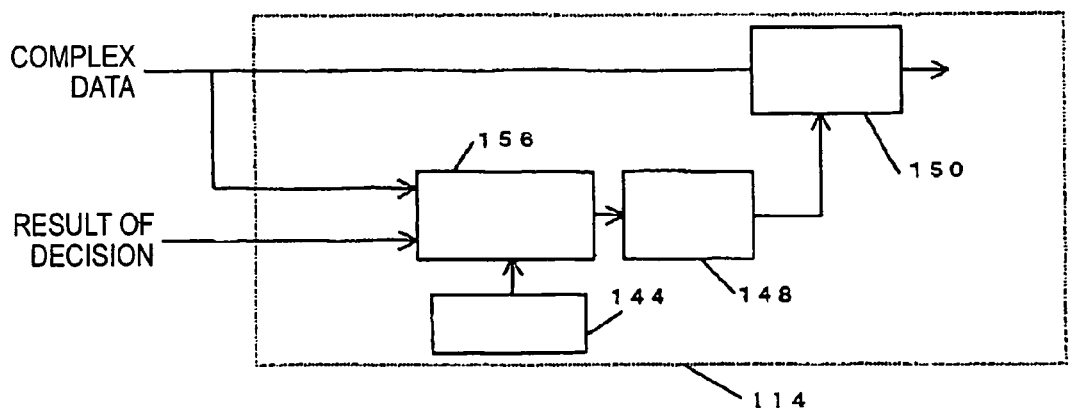
FIG. 12 is a block diagram of a receiving apparatus according to a ninth embodiment of the invention.

A receiver of the ninth embodiment has the same configurations with the receiver of the fourth embodiment except for the clock-inconsistency compensator 114. Accordingly, the algorithm of the clock-inconsistency compensator 114 will be described in detail in the present embodiment with reference to FIG. 12. As shown in FIG. 12, the clock-inconsistency compensator 114 includes the primary modulation table 144, a weighted phase-deviation calculator 156, the average sample-deviation calculator 148 and the phase-compensator 150 in the present embodiment. The weighted phase-deviation calculator 156 calculates a phase-deviation of each subcarrier caused by the clock-inconsistency using both the decision result and the complex data, and classifies the weight of the phase-deviation according to the primary modulation table 144.

An operation of the receiver 1000 having such a configuration will now be described with reference to FIG. 12. The primary modulation table 144 stores a primary modulation type, such as 2PAM, 4PAM, 8PAM, and 16PAM, of each of the subcarriers, which is set in advance. The weighted phase-deviation calculator 156 calculates a phase-deviation caused by the clock-inconsistency using both the decision result of each subcarrier and the complex data of each subcarrier output from the equalizer 112. The weighted phase-deviation calculator 156 adds a weight according to the primary modulation type of the subcarrier to the calculated phase-deviation of each subcarrier utilizing the primary modulation table 144. In the present embodiment, the weight of 16PAM is the heaviest and the weight of 2PAM is the lightest. This configuration makes it possible to minimize an effect of a noise in the transmission channel on a calculation of the average sample-deviation. Because a phase-deviation of a subcarrier under good condition has a much greater effect on the calculation of the average sample-deviation, the average sample-deviation calculator 148 calculates the average sample-deviation of the time data using the weighted phase-deviations. The phase compensator 150 compensates for the phase-deviation of each of subcarriers using the average sample-deviation.

Thus, the above-described configuration makes it possible to compensate for the clock-inconsistency even more accurately than the configuration shown in the eighth embodiment. Accordingly, the configuration of the present embodiment makes it possible to achieve accurate operation of the receiver.

Tenth Embodiment

Figure 13:
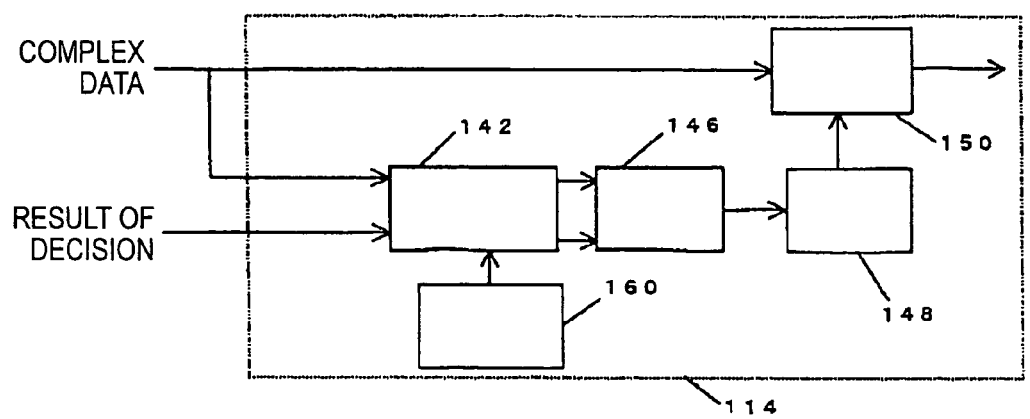
FIG. 13 is a block diagram of a receiving apparatus according to a tenth embodiment of the invention.
Figure 15:
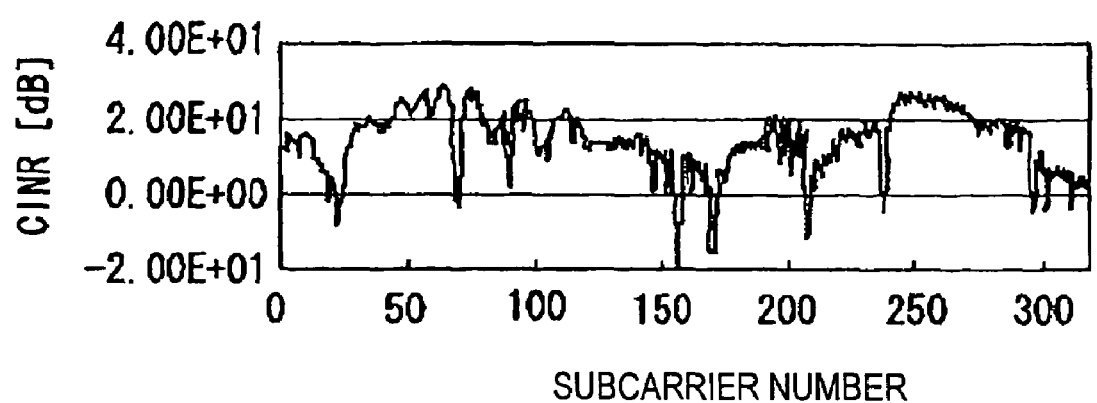
FIG. 15 is a diagram showing an example of a relationship between subcarrier numbers and values of CINR.

A receiver of the tenth embodiment has the same configurations with the receiver of the fourth embodiment except for the clock-inconsistency compensator 114. Accordingly, the algorithm of the clock-inconsistency compensator 114 will be described in detail in the present embodiment with reference to FIG. 13. As shown in FIG. 13, the clock-inconsistency compensator 114 includes a channel estimation table 160, a subcarrier selector 142, a phase-deviation calculator 146, the average sample-deviation calculator 148 and the phase-compensator 150 in the present embodiment. The channel estimation table 160 stores values that indicate a condition of the transmission channel such as CINR (Carrier power/Interference and Noise power Ratio) of each carrier as shown in FIG. 15. The channel estimation table 160 is used for selecting an appropriate subcarrier.

An operation of the receiver 1000 having such a configuration will now be described with reference to FIG. 13. The subcarrier selector 142 selects a subcarrier which is used to compensate for a clock-inconsistency utilizing the channel estimation table 144. The selection is carried out, for example, by selecting subcarriers whose CINRs are more than 10 dB. The phase-deviation calculator 146 calculates a phase deviation caused by the clock-inconsistency using both the decision result of the subcarrier selected in the subcarrier selector 142 and the complex data output from the equalizer 112. The average sample-deviation calculator 148 calculates the average sample-deviation of the time data using the phase-deviation of the selected subcarrier. The phase compensator 150 compensates for the phase-deviation of each of subcarriers using the average sample-deviation.

Thus, the above-described configuration makes it possible to improve the accuracy of clock-inconsistency. Accordingly, the configuration of the present embodiment makes it possible to achieve accurate operation of the receiver.

Eleventh Embodiment

Figure 14:
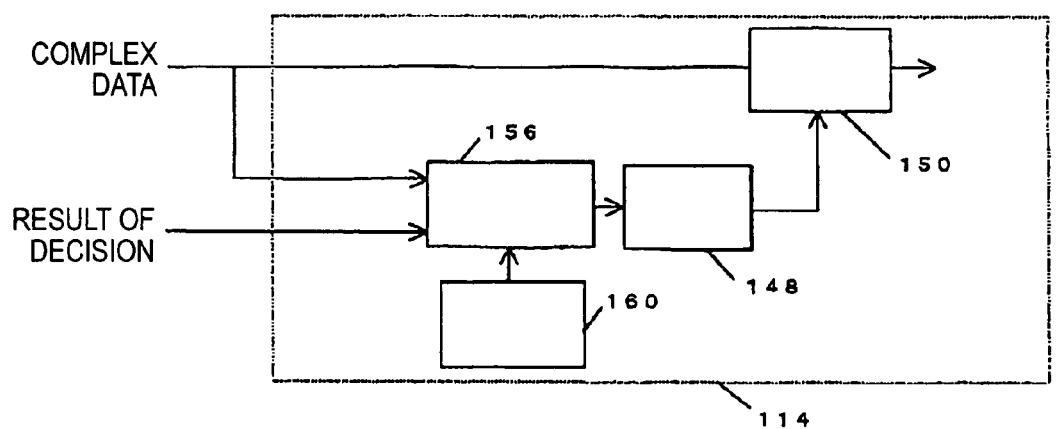
FIG. 14 is a block diagram of a receiving apparatus according to an eleventh embodiment of the invention.

A receiver of the eleventh embodiment has the same configuration with the receiver of the fourth embodiment except for the clock-inconsistency compensator 114. Accordingly, the algorithm of the clock-inconsistency compensator 114 will be described in detail in the present embodiment with reference to FIG. 14. As shown in FIG. 14, the clock-inconsistency compensator 114 includes the channel estimation table 160, the weighted phase-deviation calculator 156, the average sample-deviation calculator 148 and the phase-compensator 150 in the present embodiment.

An operation of the receiver 1000 having such a configuration will now be described with reference to FIG. 14. The channel estimation table 160 stores values that indicate a condition of the transmission channel such as CINR of each carrier as shown in FIG. 15, and is used for selecting an appropriate subcarrier. The weighted phase-deviation calculator 156 calculates a phase-deviation caused by the clock-inconsistency using both the decision result of each subcarrier and the complex data of each subcarrier output from the equalizer 112. Next, the weighted phase-deviation calculator 156 adds or multiplies a weight to a phase-deviation of each subcarrier utilizing the channel estimation table 160. The larger the value of CINR is, the heavier the weight is set. For example, the weight is "1" when the value of CINR is less than 0 dB, the weight is "2" when the value of CINR is less than 10 dB, the weight is "3" when the value of CINR is less than 20 dB, and the weight is "4" when the value of CINR is less than 30 dB. The average sample-deviation calculator 148 calculates the average sample-deviation of the time data using the weighted phase-deviations calculated by the weighted phase-deviation calculator 156. The phase compensator 150 compensates for the phase-deviation of each subcarrier using the average sample-deviation calculated by the average sample-deviation calculator 148.

Thus, the above-described configuration makes it possible to improve the accuracy of clock-inconsistency. Accordingly, the configuration of the present embodiment makes it possible to achieve an even more accurate operation of the receiver than the operation of the receiver shown in the tenth embodiment.

Twelfth Embodiment

Figure 16:
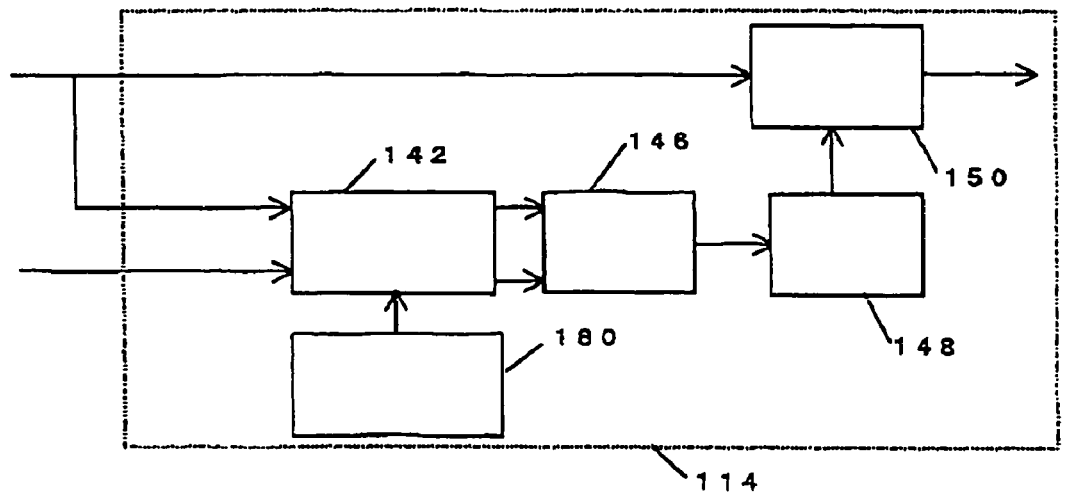
FIG. 16 is a block diagram of a receiving apparatus according to a twelfth embodiment of the invention.
Figure 17:
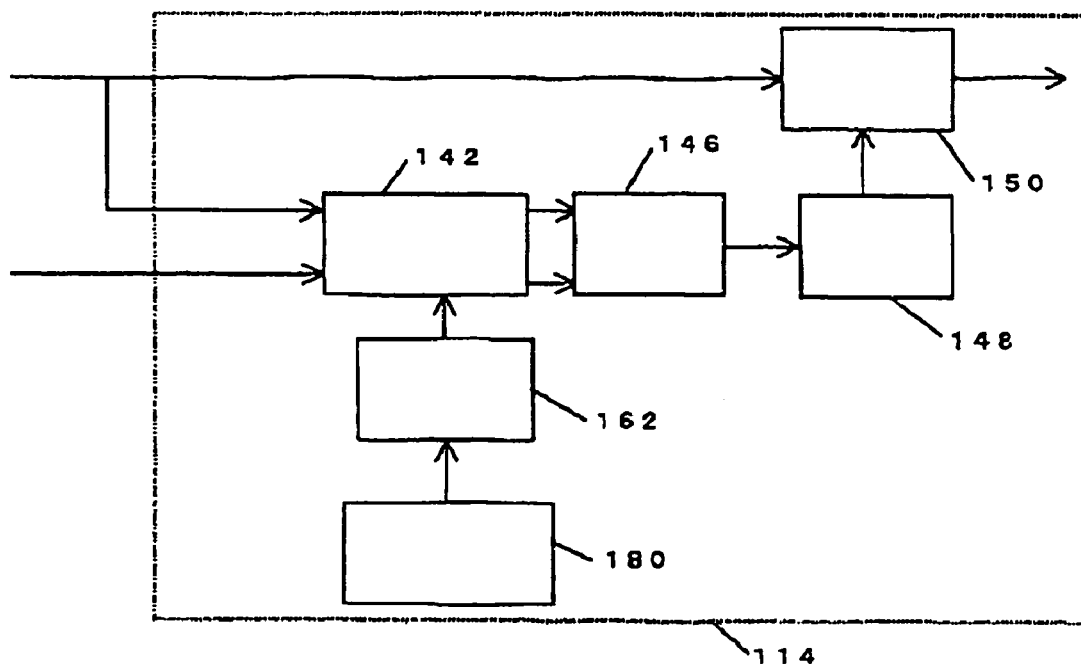
FIG. 17 is a block diagram of a receiving apparatus according to a thirteenth embodiment of the invention.
Figure 18:
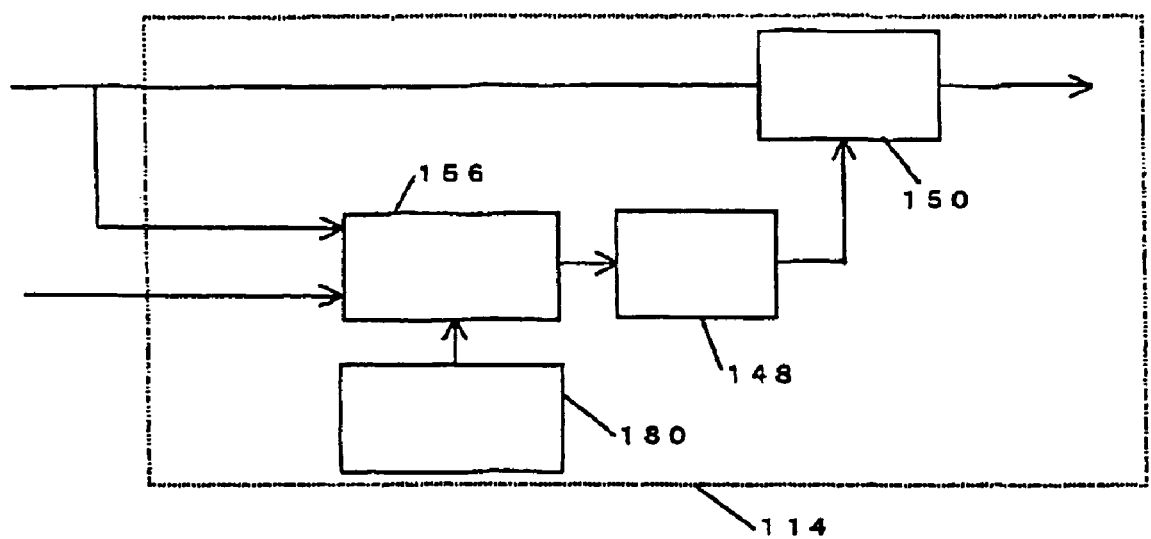
FIG. 18 is a block diagram of a receiving apparatus according to a fourteenth embodiment of the invention.
Figure 19:
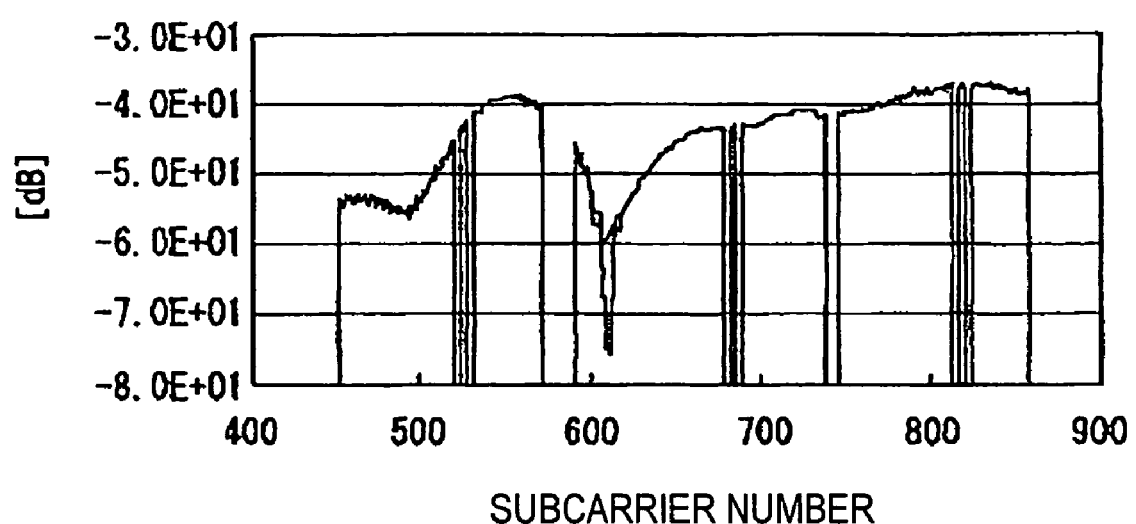
FIG. 19 is a diagram showing an example of a reciprocal of a square of a equalizer coefficient.
Figure 20:
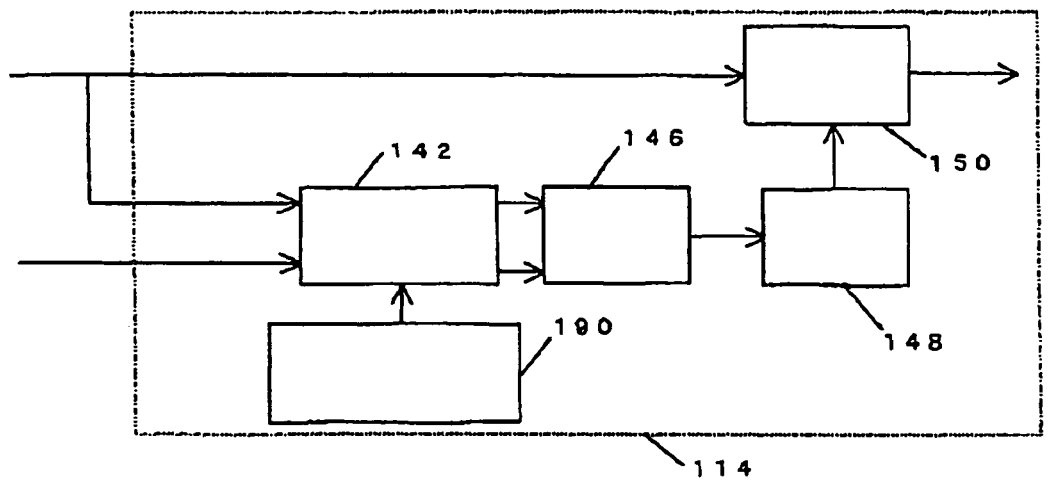
FIG. 20 is a block diagram of a receiving apparatus according to a fifteenth embodiment of the invention.
Figure 21:
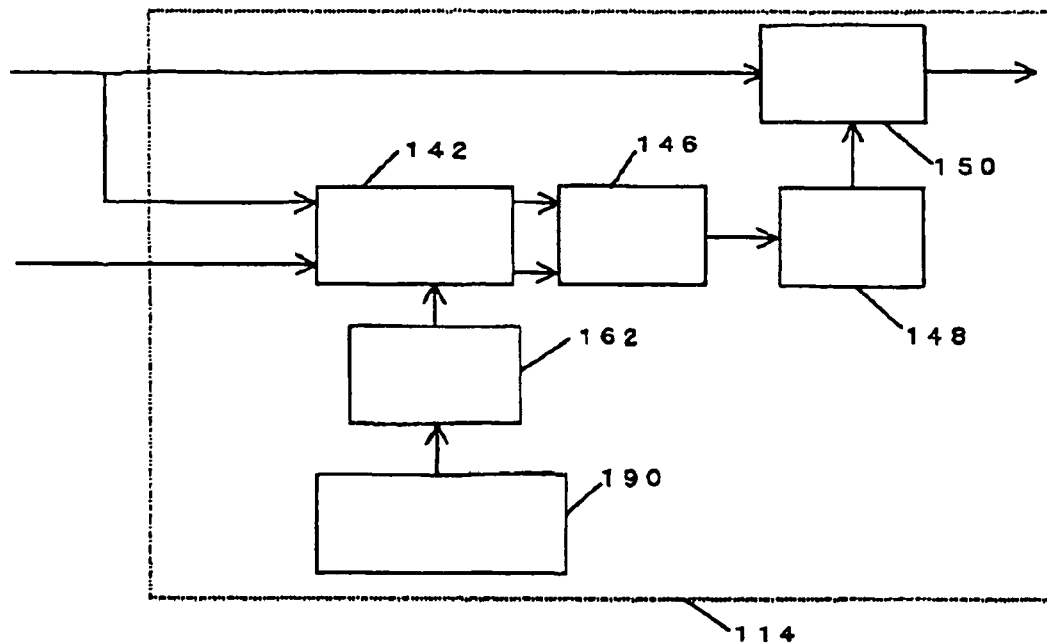
FIG. 21 is a block diagram of a receiving apparatus according to a sixteenth embodiment of the invention.
Figure 22:
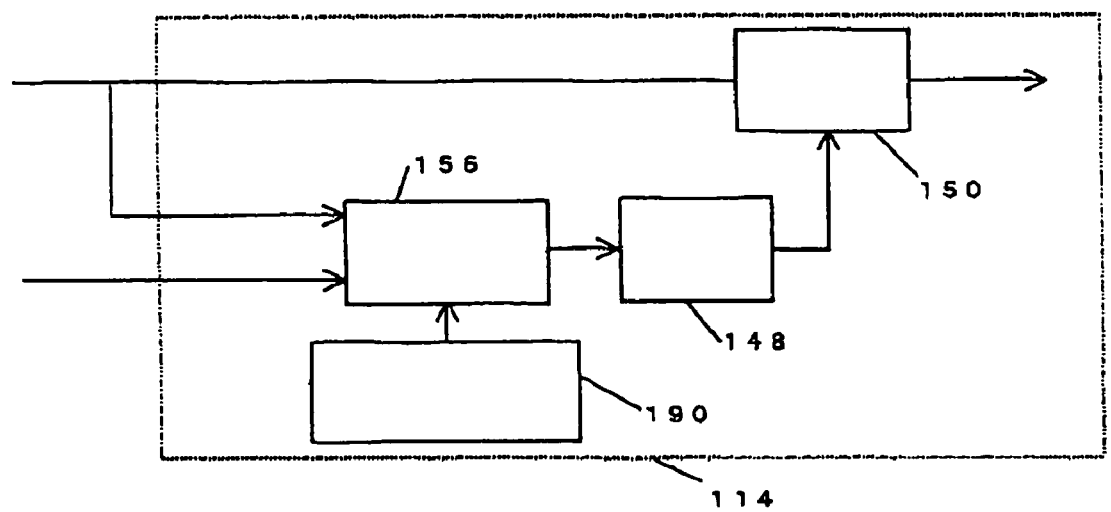
FIG. 22 is a block diagram of a receiving apparatus according to a seventeenth embodiment of the invention.

A receiver of the twelfth embodiment has the same configuration with the receiver of the fourth embodiment except for the clock-inconsistency compensator 114. Accordingly, the algorithm of the clock-inconsistency compensator 114 will be described in detail in the present embodiment with reference to FIG. 16. As shown in FIG. 16, the clock-inconsistency compensator 114 includes a reciprocal table of an equalizer coefficient 180, a subcarrier selector 142, a phase-deviation calculator 146, the average sample-deviation calculator 148 and the phase-compensator 150 in the present embodiment. The reciprocal of the equalizer coefficient 180 stores in advance each value of the reciprocal number of the equalizer coefficient of each subcarrier as shown in FIG. 19. The reciprocal table of the equalizer coefficient 180 stores a reciprocal value of the equalizer coefficient of each subcarrier that shows a condition of the transmission channel. The larger the value of the reciprocal of the equalizer coefficient, the better the condition of the transmission channel. Furthermore, a square or more of the reciprocal number table of the equalizer coefficient can be used instead of the reciprocal table of the equalizer coefficient. In the present embodiment, the square of the reciprocal number table of the equalizer coefficient is adopted as the reciprocal table of the equalizer coefficient 180.

An operation of the receiver 1000 having such a configuration will now be described with reference to FIG. 16. The subcarrier selector 142 selects a subcarrier that is used to compensate for a clock-inconsistency utilizing the reciprocal table of the equalizer coefficient 180. The selection is carried out by selecting subcarriers whose reciprocal of the equalizer coefficients are equal to or more than a certain threshold, for example, −60 dB. The phase-deviation calculator 146 calculates a phase-deviation caused by the clock-inconsistency using both the decision result of the subcarrier selected in the subcarrier selector 142 and the complex data output from the equalizer 112. The average sample-deviation calculator 148 calculates the average sample-deviation of the time data using the phase-deviation of the selected subcarrier. The phase compensator 150 compensates for the phase-deviation of each of the subcarriers using the average sample-deviation.

Thus, the above-described configuration makes it possible to improve the accuracy of clock-inconsistency. Accordingly, the configuration of the present embodiment makes it possible to achieve an even more accurate operation of the receiver than the operation of the receiver shown in the fourth embodiment.

Thirteenth Embodiment

A receiver of the thirteenth embodiment has the same configuration with the receiver of the twelfth embodiment except for adding a limiter 162 between the subcarrier selector 142 and the reciprocal table of the equalizer coefficient 180. Accordingly, the operation of the limiter 162 and the algorithm of the clock-inconsistency compensator 114 will be described in detail in the present embodiment with reference to FIG. 17.

The limiter 162 limits the values of the inverse equalizer coefficient stored in the reciprocal table of the equalizer coefficient 180 that are smaller than a certain threshold stored in the limiter 162. The limiter 162 does not send the value of the inverse equalizer coefficient, which is smaller than the threshold, or set a kind of flag, which notes the subcarrier corresponding to the inverse equalizer coefficient can not be used, in order to compensate for the clock-inconsistency. The subcarrier selector 142 selects a subcarrier that is used to compensate for a clock-inconsistency utilizing the inverse equalizer coefficient after passing the limiter 162. The subcarrier selector 142 can use all subcarriers corresponding to all of the inverse equalizer coefficients passing the limiter 162, or it can select some subcarriers, which are in a better condition, from all subcarriers corresponding to all of the inverse equalizer coefficients passing the limiter 162.

Thus, the above-described configuration makes it possible to improve the accuracy of clock-inconsistency. Furthermore, the receiver shown in the present embodiment makes it possible to achieve an even higher tolerance for narrow band interference than that of the receiver shown in the twelfth embodiment.

Fourteenth Embodiment

A receiver of the fourteenth embodiment has the same configurations with the receiver of the eleventh embodiment except for using the reciprocal table of the equalizer coefficient 180 instead of the channel estimation table 160. Accordingly, the algorithm of the clock-inconsistency compensator 114 will be described in detail in the present embodiment with reference to FIG. 18.

The inverse equalizer coefficient 180 stores in advance each value of inverse equalizer coefficient of each subcarrier as shown in FIG. 19. The inverse equalizer coefficient shows a condition of the transmission channel. The weighted phase-deviation calculator 156 calculates a phase-deviation caused by the clock-inconsistency using both the decision result of each subcarrier and the complex data of each subcarrier output from the equalizer 112. Next, the weighted phase-deviation calculator 156 adds or multiplies a weight to the phase-deviation of each subcarrier utilizing the inverse equalizer coefficient 180. The larger the value of the inverse equalizer coefficient, the heavier the weight is set. For example, the weight is "1" when the value of the inverse equalizer coefficient is less than −70 dB, the weight is "2" when the value of the inverse equalizer coefficient is less than −60 dB and equal to or more than −70 dB, the weight is "3" when the value of the inverse equalizer coefficient is less than −50 dB and equal to or more than −60 dB, and the weight is "4" when the value of the inverse equalizer coefficient is equal to or more than −50 dB. The average sample-deviation calculator 148 calculates the average sample-deviation of the time data using the weighted phase-deviations calculated by the weighted phase-deviation calculator 156. The phase compensator 150 compensates for the phase-deviation of each subcarrier using the average sample-deviation calculated by the average sample-deviation calculator 148.

Thus, the above-described configuration makes it possible to improve the accuracy of clock-inconsistency. Accordingly, the configuration of the present embodiment makes it possible to achieve an even more accurate operation of the receiver than the operation of the receiver shown in the twelfth embodiment.

Fifteenth Embodiment

A receiver of the fifteenth embodiment has the same configuration with the receiver of the fourteenth embodiment except for using a phase difference table 190 instead of the reciprocal table of the equalizer coefficient 180. Accordingly, the phase difference table 190 and the algorithm of the clock-inconsistency compensator 114 will be described in detail in the present embodiment with reference to FIG. 20.

An operation of the receiver 1000 having such a configuration will now be described. The phase-difference table 190 will be described with reference to FIG. 23. In order to simplify the explanation of the phase-difference table 190, it is assumed that an 8 wavelet transformer is used in the present embodiment, that is, there are 8 subcarriers.

Figure 23:
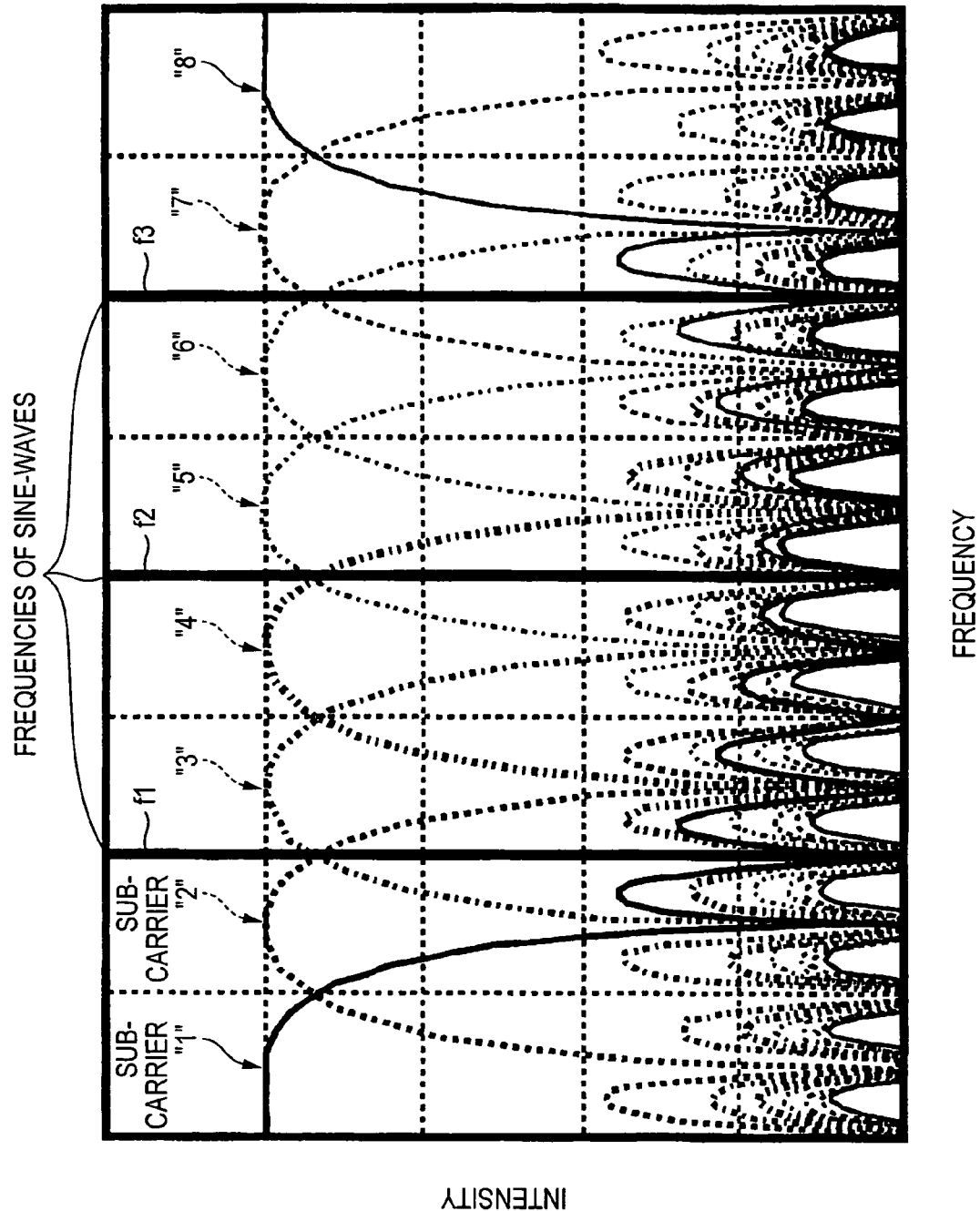
FIG. 23 is a spectrum diagram showing a relationship between subcarrier numbers and frequencies of sine waves.
Figure 24:
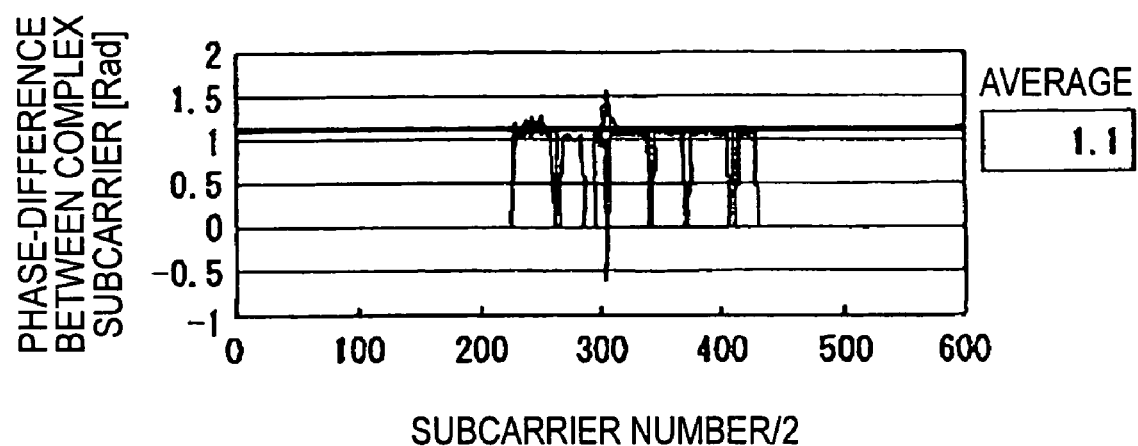
FIG. 24 is a graph showing an average of phase-deviations between subcarriers and a distribution of phase-deviations.

A composite wave is produced as a wave form to add a plurality of sine-waves which have F1 to F3, as shown in FIG. 23, when the transmitter sends the same inverse wavelet-transformed data, for example "1", to each subcarrier for a few consecutive symbols. The sine-wave mainly consists of two subcarriers, for example, the first sine-wave which has a frequency of "F1", mainly consists of subcarriers No. 2 and No. 3. The two subcarriers which mainly consist of the sine-wave is now called "a subcarrier pair". When the receiver receives the composite wave, the receiver obtains complex information, which is included in received data output from a complex data generator, corresponding to a plurality of the "Fn". Next, each complex division is carried out between two consecutive subcarrier pairs, and each result of the complex division shows a phase-difference on the complex coordinate. An average of the phase-differences is calculated by adding the phase-differences in the complex adder. The phase-difference table 190 stores the average of the phase-differences and all of the phase-differences between two consecutive subcarrier pairs (complex subcarriers) in advance as shown in FIG. 24.

Next, an operation of the clock-inconsistency compensator 114 will be described in detail. The subcarrier selector 142 selects a subcarrier which is used to compensate for a clock-inconsistency utilizing the phase-difference table 190. The selection is carried out, for example, by selecting subcarriers whose phase-differences between two consecutive subcarrier pairs are more than, for example, the average or 1 [rad]. The phase-deviation calculator 146 calculates a phase-deviation caused by the clock-inconsistency using both the decision result of the subcarrier selected in the subcarrier selector 142 and the complex data output from the equalizer 112. The average sample-deviation calculator 148 calculates the average sample-deviation of the time data using the phase-deviation of the selected subcarrier. The phase compensator 150 compensates for the phase-deviation of each of the subcarriers using the average sample-deviation.

Thus, the above-described configuration makes it possible to improve the accuracy of clock-inconsistency.

Sixteenth Embodiment

A receiver of the sixteenth embodiment has the same configuration with the receiver of the fifteenth embodiment except for adding a limiter 162 between the subcarrier selector 142 and the phase-difference table 190. Accordingly, the operation of the limiter 192 and the algorithm of the clock-inconsistency compensator 114 will be described in detail in the present embodiment with reference to FIG. 21.

The limiter 192 limits the phase-difference between two consecutive subcarrier pairs stored in the phase-difference table 190 when the phase-difference is smaller than a certain threshold stored in the limiter 192. The limiter 192 does not send information about such subcarriers that have a smaller phase-difference than the threshold to the subcarrier selector 142 or the limiter 192 sets a kind of flag, which notes that the subcarrier corresponding to the phase-difference can not be used, in order to compensate for the clock-inconsistency. The subcarrier selector 142 selects a subcarrier that is used to compensate for a clock-inconsistency utilizing the phase-difference after passing the limiter 192. The subcarrier selector 142 can use all subcarriers corresponding to all of the phase-differences passing the limiter 192, or can select some subcarriers, which are under better condition, from all subcarriers corresponding to all of the phase-differences passing the limiter 192.

Thus, the above-described configuration makes it possible to improve the accuracy of clock-inconsistency. Furthermore, the receiver shown in the present embodiment makes it possible to achieve an even higher tolerance for narrow band interference than that of the receiver shown in the fifteenth embodiment.

Seventeenth Embodiment

A receiver of the seventeenth embodiment has the same configurations with the receiver of the fifteenth embodiment except for using the weighted phase-deviation calculator 156 instead of using the subcarrier selector 142 and the phase-deviation calculator 146. Accordingly, the algorithm of the clock-inconsistency compensator 114 will be described in detail in the present embodiment with reference to FIG. 22.

The clock-inconsistency compensator 114 includes the phase-difference table 190, the weighted phase-deviation calculator 156, the average sample-deviation calculator 148 and the phase-compensator 150 in the present embodiment. The weighted phase-deviation calculator 156 calculates a phase-deviation of each subcarrier caused by the clock-inconsistency using both the decision result of each subcarrier and the complex data of each subcarrier output from the equalizer 112. The phase-difference table 190 stores the phase-differences between subcarrier pairs in advance as shown in FIG.

24. The weighted phase-deviation calculator 156 adds a weight according to the phase-difference to the calculated phase-deviation of each subcarrier utilizing the phase-difference table 190. In the present embodiment, the weight is heaviest when the phase difference is 1.1 [rad] and the weight is the lightest when the phase difference is less than 0.7 [rad] or more than 1.5 [rad]. The lightest weight can be zero in the present embodiment. This configuration makes it possible to minimize an effect of the condition of the transmission channel on a calculation of the average sample-deviation because a phase-deviation of a subcarrier under good condition has a much greater effect on the calculation of the average sample-deviation. The average sample-deviation calculator 148 calculates the average sample-deviation of the time data using the weighted phase-deviations. The phase compensator 150 compensates for the phase-deviation of each of subcarriers using the average sample-deviation.

Thus, the above-described configuration makes it possible to compensate for the clock-inconsistency even more accurately than the configuration shown in the fifteenth embodiment. Accordingly, the configuration of the present embodiment makes it possible to achieve accurate operation of the receiver.

While the invention may be applied to a wide variety of communication apparatus for transmitting and receiving signals, it is suitable for systems for power line communication (PLC) that may employ a transmission path in a bad condition.

Figure 30:
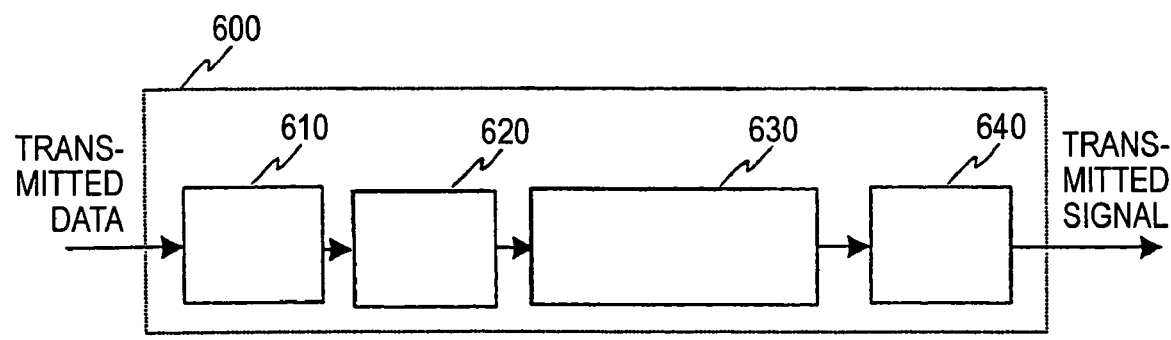
FIG. 30 is a block diagram of a transmitter that forms a part of a communication apparatus.
Figure 31:
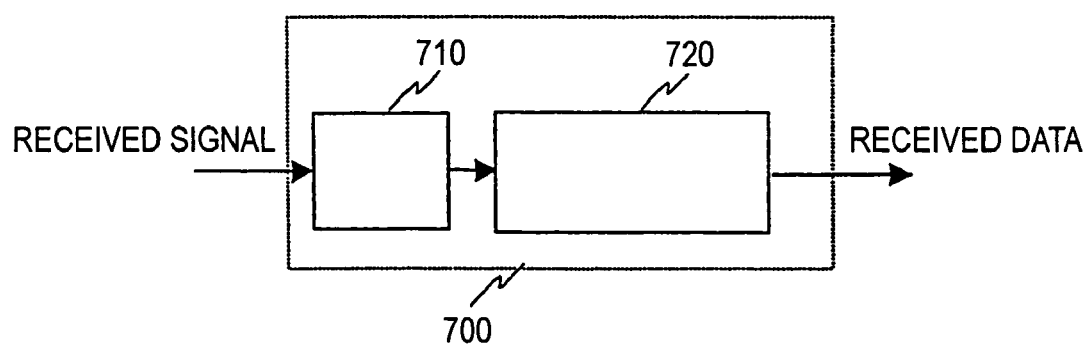
FIG. 31 is a block diagram of a receiver that forms a part of a communication apparatus.

In FIGS. 30 and 31, a transmitting section 600, a part of transmitter, includes a symbol mapper 610, a serial-to-parallel (S/P) converter 620, a modulator 630, and a digital-to-analog (D/A) converter 640. At the transmitting section 600 of the transmitter, the symbol mapper 610 converts bit data into symbol data and maps the symbol data into a certain arrangement of signal points according to a certain data point mapping information. The S/P converter 620 converts serial data output from the symbol mapper 610 into parallel data. The modulator 630 has a filter bank involving M filters, which are orthogonal with respect to each other, and modulates the parallel data output from the S/P converter 620 to be transmitted by performing an inverse transform. The D/A converter 640 converts a digital signal to an analog signal. A receiving section 700 includes an A/D converter 710 and a demodulator 720. At the receiving section 700 of the receiver, the A/D converter 710 converts a received analog signal to a digital signal. The demodulator 720 has a filter bank involving M filters, which are orthogonal with respect to each other, demodulates received data input from the D/A converter 710 by transforming the received data, and can includes the configurations described in the embodiments 1 to 17. Filter banks of the modulator 630 and the demodulator 720 include wavelet-based cosine transform filter bank and FFT-based pulse shaping type OFDMs. The wavelet-based cosine transform filter bank has a long filter length, for example, 4N (N is a symbol length, generally M=N.)

In addition, frequency bands utilized by PLC overlap amateur radio bands. To minimize an influence of the amateur radio bands, notches are formed by disabling subcarriers and modulation and demodulation processes are carried out using filter banks. The use of band-limited multi-carriers allows PLC to be more resistant to narrow band interference waves and inter-carrier interference. Since the band of each subcarrier is limited, a sharp notch can be formed by disabling several subcarriers.

Deregulation is in progress to allow the use of the band from 2 MHz to 30 MHz for PLC. However, other existing systems (e.g., amateur radios and shortwave broadcasts.) use the same band. Since no interfere with such other existing systems is allowed, ideally, signals should be transmitted to the band used by other existing systems during PLC. Normally, a notch filter is generated by a separate filter to disable transmission to the band used by existing systems. A notch filter for 30 dB is used in "HomePlug 1.0" released by HomePlug that is an alliance with PLC businesses in the United States. Thus, a possible target for the suppression of interference to other existing systems is 30 dB or more.

According to the inventive configuration and method, a filter bank is used to limit the band of each subcarrier to disable subcarriers that overlap the band used by existing systems, which makes it possible to achieve the same operation as in the method of the related art (the operation of generating notches in the band used by other existing systems) without generating notch filter. The deeper the notches are formed, the greater the filter length of each of the M filters of the filter bank. In this case, there is a concern about a delay attributable to the filters (a filter delay is a trade-off for the notch depth) It is therefore possible to form notches of 30 dB or more and suppress a filter delay by limiting the filter length of a filter bank for PLC to 4N (N is a symbol length, generally M=N).

Figure 25:
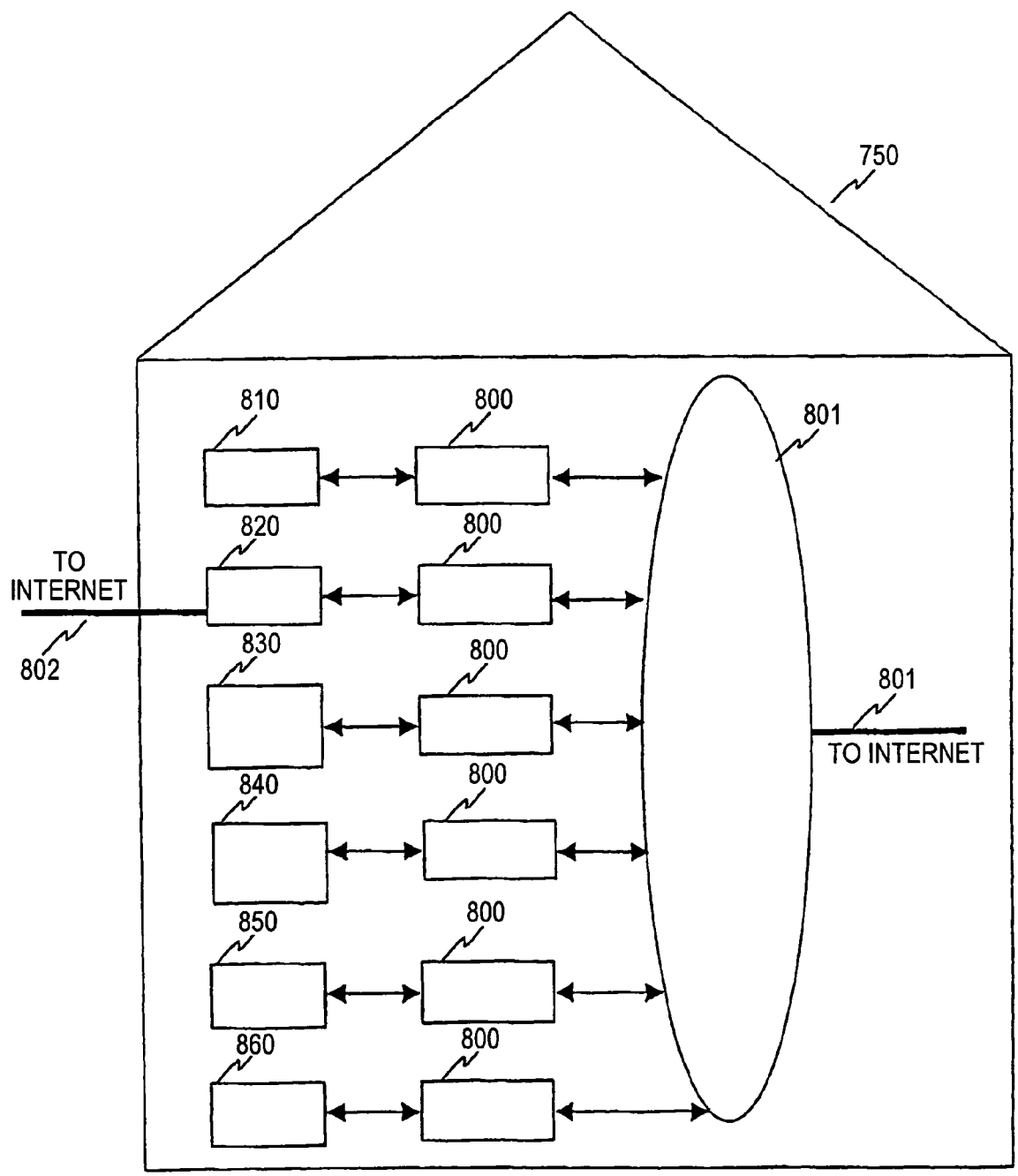
FIG. 25 is a block diagram of a power line communication system.
Figure 26:
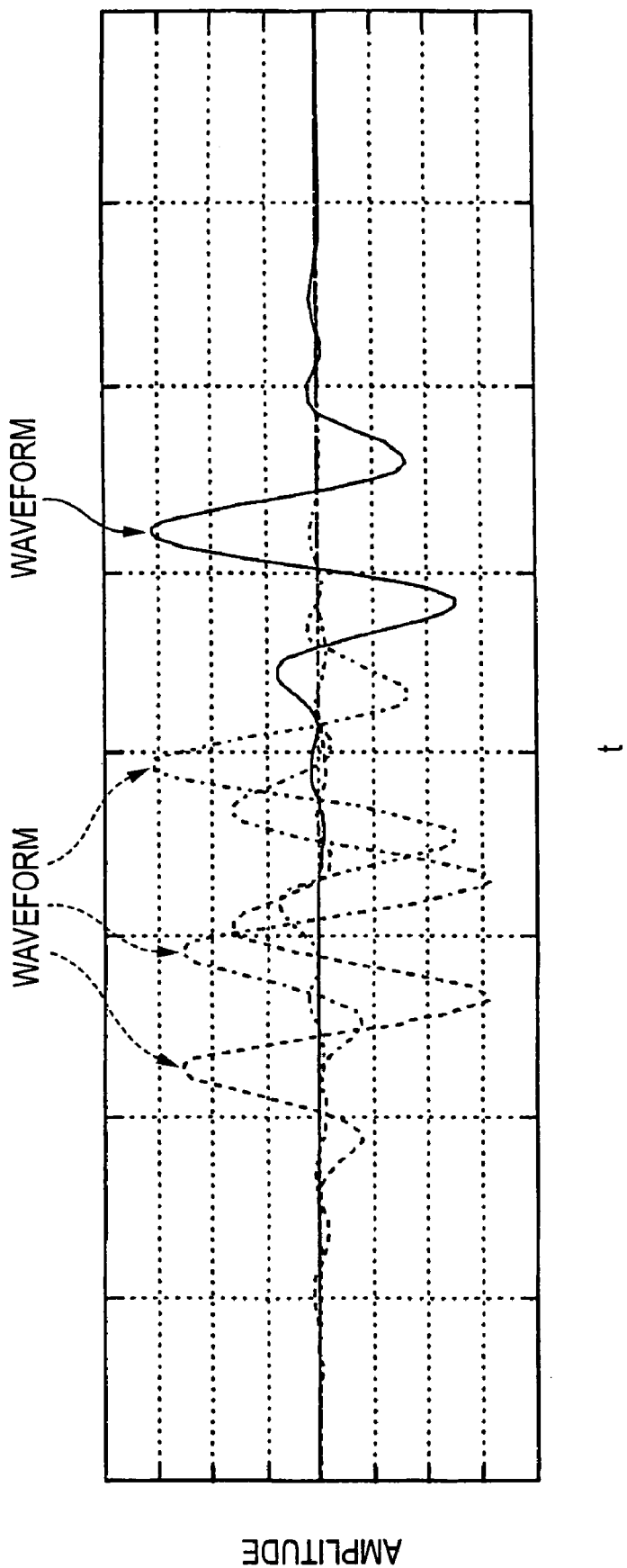
FIG. 26 is a waveform diagram showing a wavelet waveform.
Figure 27:
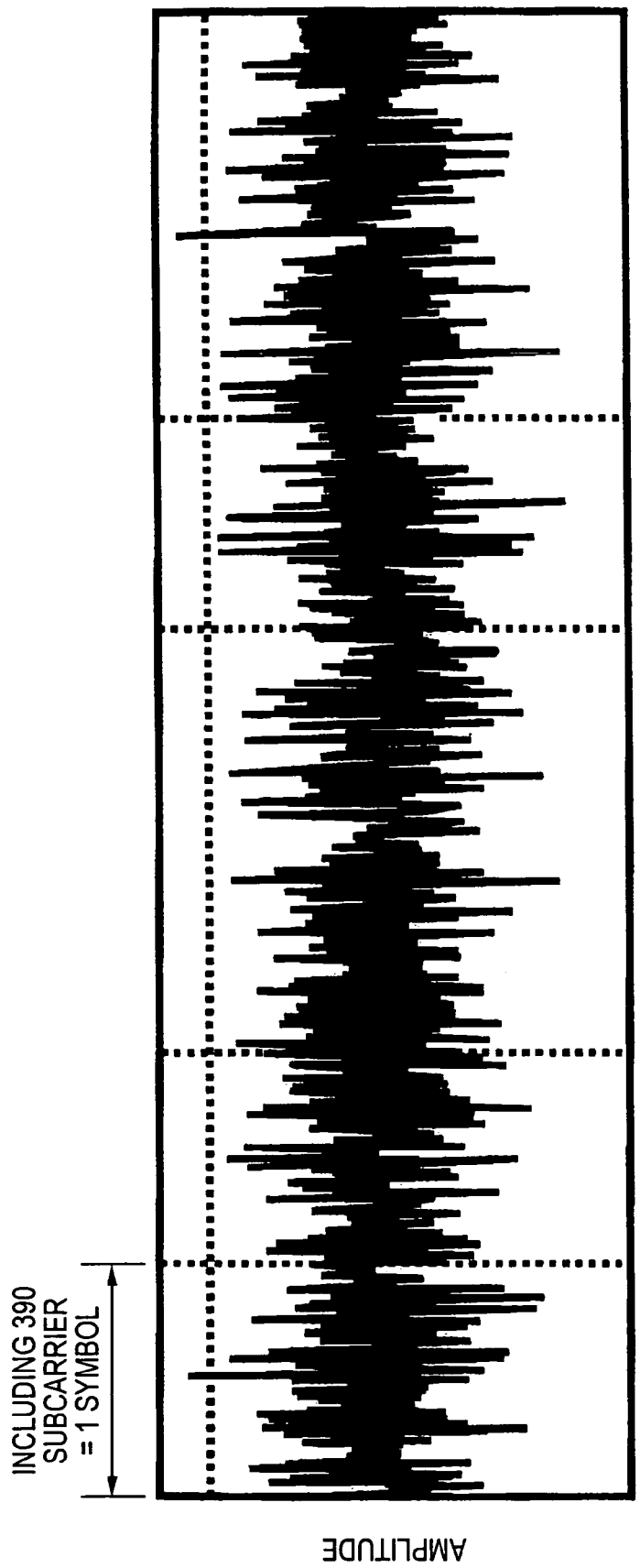
FIG. 27 is a waveform diagram showing an example of a transmitted waveform according to the DWMC transmission method.
Figure 28:
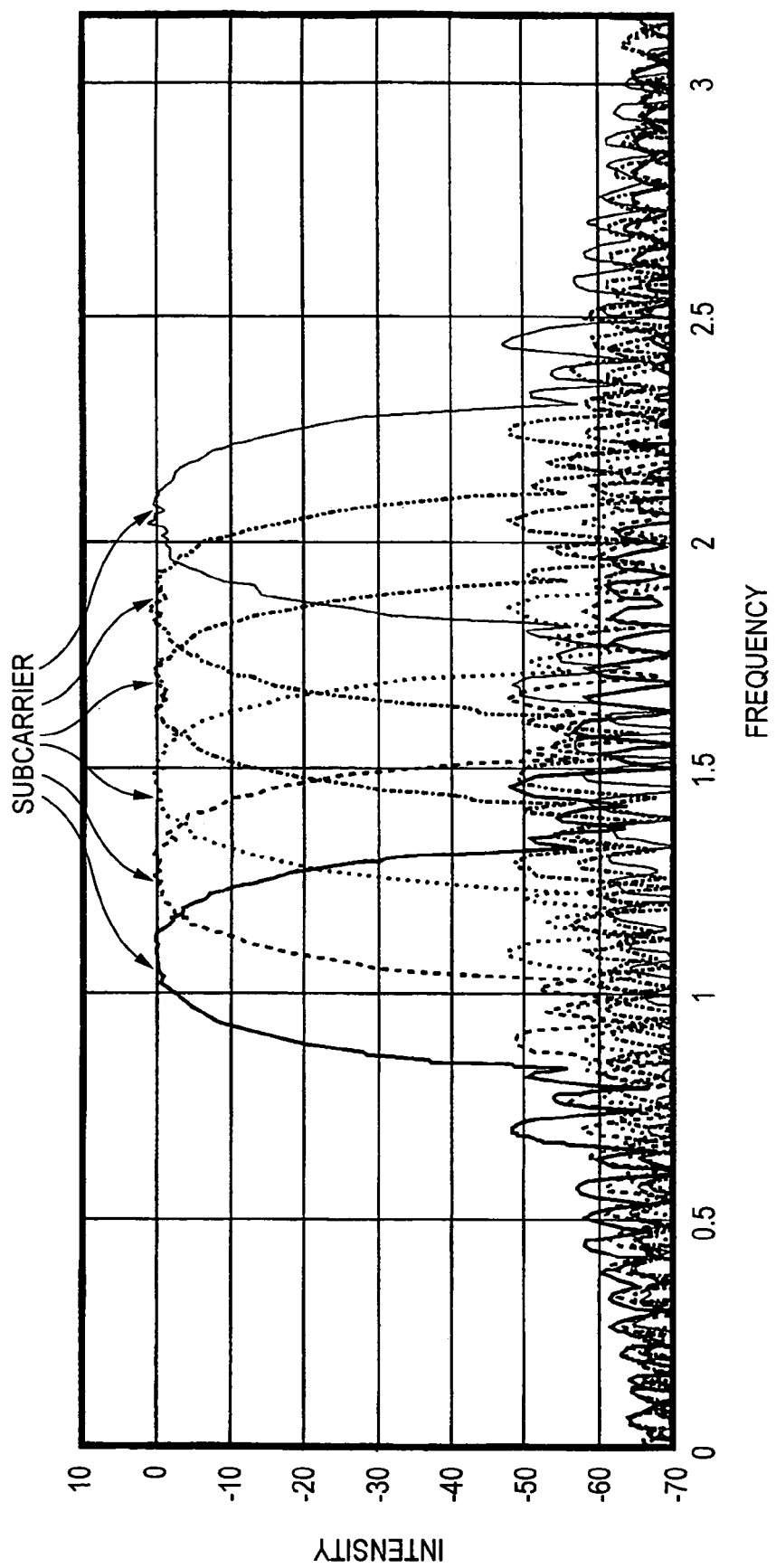
FIG. 28 is a spectrum diagram showing an example of a transmitted spectrum according to the DWMC transmission method.

Next, an example of a PLC system will be described in detail. As shown in FIG. 25, a PLC system in a building 750 includes a power line 801, a conventional network 802 such as a telephone network, an optical network, or a CATV network; a communication apparatus 800 including both the transmission section 600 and the receiving section 700; an AV apparatus 810 such as a television set, a video, a DVD, or a DV camera; a telecommunication apparatus 820 such as a router, an ADSL, a VDSL a media converter, or a telephone; a documentation apparatus 830 such as a printer, a facsimile, or a scanner; a security apparatus 840 such as a camera or an interphone; a computer 850; and a home electrical apparatus 860 such as an air conditioner, a refrigerator, a washing machine, or a microwave oven.

An operation of the PLC system will be described. The apparatuses form a network through the power line 801 and perform bidirectional communication using the communication apparatus 800. Referring to communication to the internet, a connection may be made via a home gateway provided in the building 750 through the power line 801. Alternatively, a connection may be made via the telecommunication apparatus 820 that communicates over the conventional network 802. Alternatively, a connection may be made on a wireless basis from the telecommunication apparatus 820 having a radio function. Since the communication apparatus 800 used here performs modulation and demodulation processes using filter banks involving M filters which are orthogonal with respect to each other, the interference with the other existing systems can be suppressed by disabling subcarriers that overlap the band used by the other existing systems. Further, since the filter length is limited to 4N (N is a symbol length, generally M=N), delays attributable to the filters can be suppressed while achieving a notch depth of 30 dB or more. On the contrary, the effect of narrow band interferences from the other existing systems can be reduced.

Furthermore, when a notch is to be generated in a certain band, what is required is only to disable any subcarrier that overlaps the band. It is therefore possible to comply with regulations in various countries easily with flexibility. Even when there is a regulation change after the present system is put in use, it can be accommodated with flexibility through an action such as firmware upgrading.

In addition, the configurations of the first to eighteenth embodiments can be combined with each other as needed.

Furthermore, according to the configurations of the first to seventeenth embodiments, when the maximal number of subcarriers that are used for the clock-inconsistency compensator 114 is "X" and the number of subcarriers that meet a certain condition such as a threshold are more than "X" at selecting the subcarriers, it is preferable that the subcarriers are preferentially selected in order of increasing frequency. This configuration makes it possible to improve the accuracy of compensating the clock-inconsistency.

In particular, when a multiple primary modulation type is used in a modulator, it is also preferable that the subcarriers are preferentially selected in order of increasing the absolute value of the result of the decision. This configuration makes it possible to improve the accuracy of compensating the clock-inconsistency.

In addition, when the maximal number of subcarriers that are used for the clock-inconsistency compensator 114 is "X" and the number of subcarriers that meet a certain condition such as a threshold are more than "X" at selecting the subcarriers, it is also preferable that the subcarriers are selected in order of increasing a orthogonal component of each subcarrier. This configuration makes it possible to improve the accuracy of compensating the clock-inconsistency.

Figure 32:
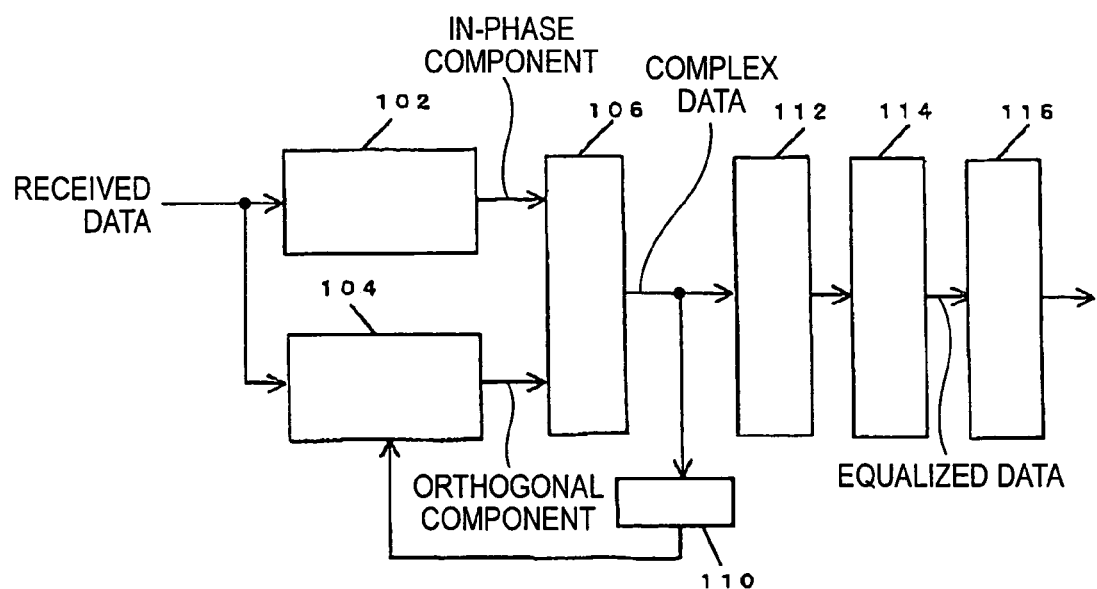
FIG. 32 is a block diagram of a receiving apparatus according to another embodiment of the invention.
Figure 33:
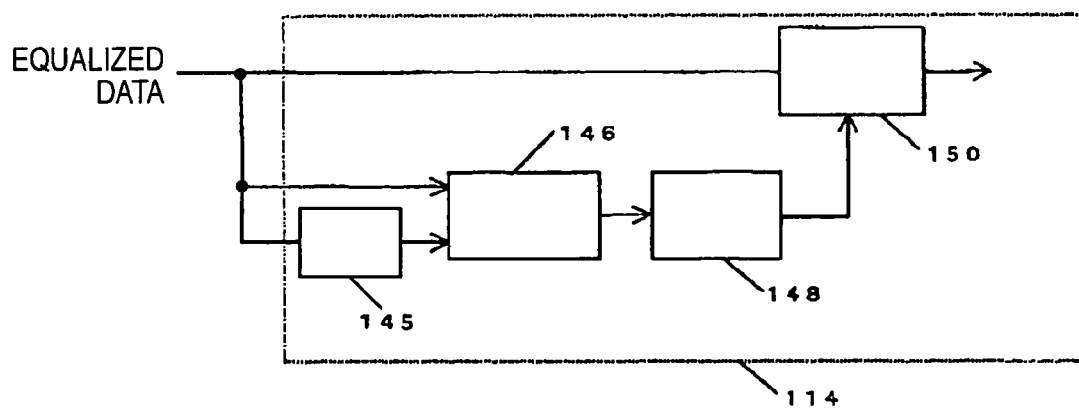
FIG. 33 is a block diagram of a clock-inconsistency compensator according to another embodiment of the invention.

Furthermore, another configuration shown in FIGS. 32 and 33 will be described. In the configuration, the clock-inconsistency compensator 114 also includes another decision unit 145 and the decision data from the decision unit 116 does not feed back to the clock-inconsistency compensator to calculate the clock-inconsistency. The decision unit 145 receives the equalized data from the equalizer 112, decides whether a data used in the communication exists or not in the equalized data, and outputs the result of the decision to the phase-deviation calculator 146. The phase-deviation calculator 146 calculates a phase-deviation of each of the subcarriers utilizing the equalized data from the equalizer 112 and the result of the decision from the decision unit 145. The above-mentioned configuration makes it possible to improve the accuracy of the calculation in the clock-inconsistency compensator 114 because the calculation is carried out without one symbol delay caused by feeding back the result of the decision from the decision unit 116. Furthermore, The above-mentioned configuration may have applicability to the all embodiments instead of feeding back the result of the decision from the decision unit 116.

Figure 10:
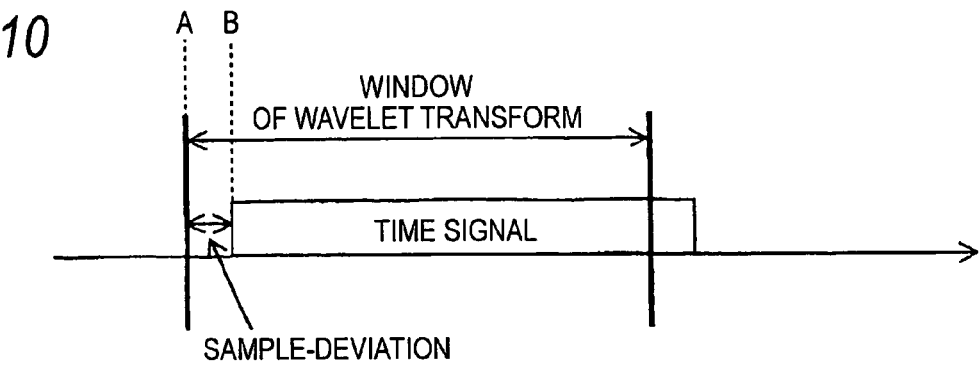
FIG. 10 is a pattern diagram showing an example of an average sample-deviation of a time signal.

In addition, by adding each sample-deviation calculated in the sample-deviation calculator 148 cumulatively, storing the result of the adding to a memory, and being monitored the result value stored in the memory by a controller (not shown in any Figs), a timing of performing a wavelet transform can be adjusted to the result value when the controller judges that the result value is greater than a certain value. For example, when the total sample-deviation shown in FIG. 10 is greater than a certain value, then the window of the wavelet transform (the timing of the wavelet transform) is adjusted so that the reference position "A" of the window shown in FIG. 10 coincides with the reference position "B" of the time signal shown in FIG. 10.

The receiver-described in the first to seventeenth embodiment can compensate for the clock-inconsistency between the transmitter and the receiver in the DWMC transmission method without using the pilot-carrier by obtaining a phase-deviation (an amount of phase-rotation) caused by the clock-inconsistency using both the decision result of each subcarrier and the complex data output from the equalizer.

CROSS REFERENCE TO RELATED APPLICATION

This application is based upon and claims the benefit of priority of Japanese Patent Application No. 2003-173202 filed on Jun. 18, 2003, the contents of which is incorporated herein by reference in its entirety.

What is claimed is:

1. A receiver employing a digital wavelet multi-carrier demodulation for receiving data transmitted from a transmitter by Pulse Amplitude Modulation, said receiver comprising:
a first wavelet transformer operable to perform a wavelet transform of received data;
a second wavelet transformer operable to perform a wavelet transform of the received data, said second wavelet transformer being orthogonal to said first wavelet transformer;
a complex data generator operable to generate complex data by defining outputs from said first wavelet transformer as in-phase components of complex information and outputs from said second wavelet transformer as orthogonal components of the complex information, and output the complex data;
an equalizer operable to equalize the complex data, and output an equalized complex data;
a clock-inconsistency compensator operable to select, based on a decision data which exists on the real axis on Cartesian coordinates, a single line among a plurality of predetermined lines, which are parallel to the imaginary axis on Cartesian coordinates, on which the equalized complex data would be distributed if the clock-inconsistency did not exist, replace an orthogonal component of the equalized complex data with a predetermined value, calculate an angle between the selected line and a line which passes through both the equalized complex data having the predetermined value as the orthogonal component and the decision data, perform compensation of a clock-inconsistency between said receiver and the transmitter by using the angle and obtain compensated complex data based on said compensation of said clock inconsistency; and
said decision unit operable to decide whether the decision data used in communication corresponds to the compensated complex data in accordance with said Pulse Amplitude Modulation, and output the decision data.

2. The receiver according to claim 1, wherein said clock-inconsistency compensator comprises:
a phase-deviation calculator operable to calculate a phase-deviation of each subcarrier, which is caused by the clock-inconsistency between said receiver and the transmitter, by using the decision data and the equalized complex data, and output the phase-deviation of each subcarrier;
an average sample-deviation calculator operable to calculate an average sample-deviation of a time signal by using the phase-deviation of each subcarrier, and output the average sample-deviation of the time signal; and
a phase compensator operable to compensate a phase of each subcarrier by using the average sample-deviation of the time signal.

3. The receiver according to claim 2, wherein said phase-deviation calculator is operable to use a relation of a circle and a tangential line for calculating the phase-deviation of each subcarrier.

4. The receiver according to claim 3, wherein said phase-deviation calculator is operable to use a threshold of an orthogonal component in an algorithm for calculating the phase-deviation.

5. The receiver according to claim 2 wherein the phase-deviation calculator calculates the phase-deviation based on an angle at which the predetermined line and another line cross, the another line being on both the decision data and the equalized complex data.

6. The receiver according to claim 1, wherein said clock-inconsistency compensator further comprises:
  a primary modulation table operable to store a primary modulation type of each subcarrier;
  a subcarrier selector operable to select a subcarrier used to compensate for the clock-inconsistency utilizing said primary modulation table;
  a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
  an average sample-deviation calculator operable to calculate an average sample-deviation of a time signal by using the phase-deviation of each subcarrier, and output the average sample-deviation of the time signal; and
  a phase compensator operable to compensate a phase of each subcarrier by using the average sample-deviation of the time signal.

7. The receiver according to claim 1, wherein said clock-inconsistency compensator further comprises:
  a primary modulation table operable to store a primary modulation type of each subcarrier;
  a weighted phase-deviation calculator operable to calculate a phase-deviation of each subcarrier, which is caused by the clock-inconsistency between said receiver and the transmitter, by using the decision data, the equalized complex data, and a weight obtained from said primary modulation table, and output the phase-deviation of each subcarrier;
  an average sample-deviation calculator operable to calculate an average sample-deviation of a time signal by using the phase-deviation of each subcarrier, and output the average sample-deviation of the time signal; and
  a phase compensator operable to compensate a phase of each subcarrier by using the average sample-deviation of the time signal.

8. The receiver according to claim 1, wherein said clock-inconsistency compensator further comprises:
  a channel estimation table operable to store values that indicate a condition of the transmission channel of each subcarrier;
  a subcarrier selector operable to select a subcarrier used to compensate for the clock-inconsistency utilizing said channel estimation table;
  a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
  an average sample-deviation calculator operable to calculate an average sample-deviation of a time signal by using the phase-deviation of each subcarrier, and output the average sample-deviation of the time signal; and
  a phase compensator operable to compensate a phase of each subcarrier by using the average sample-deviation of the time signal.

9. The receiver according to claim 1, wherein said clock-inconsistency compensator further-comprises:
  a channel estimation table operable to store values that indicate a condition of the transmission channel of each subcarrier;
  a weighted phase-deviation calculator operable to calculate a phase-deviation of each subcarrier, which is caused by the clock-inconsistency between said receiver and the transmitter, by using the decision data, the equalized complex data, and a weight obtained from said channel estimation table, and output the phase-deviation of each subcarrier;
  an average sample-deviation calculator operable to calculate an average sample-deviation of a time signal by using the phase-deviation of each subcarrier, and output the average sample-deviation of the time signal; and
  a phase compensator operable to compensate a phase of each subcarrier by using the average sample-deviation of the time signal.

10. The receiver according to claim 1, wherein said clock-inconsistency compensator further comprises:
  a reciprocal table of a equalizer coefficient operable to store a reciprocal value of the equalizer coefficient of each subcarrier;
  a subcarrier selector operable to select a subcarrier used to compensate for the clock-inconsistency utilizing said reciprocal table of the equalizer coefficient;
  a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
  an average sample-deviation calculator operable to calculate an average sample-deviation of a time signal by using the phase-deviation of each subcarrier, and output the average sample-deviation of the time signal; and a phase compensator operable to compensate a phase of each subcarrier by using the average sample-deviation of the time signal.

11. The receiver according to claim 1, wherein said clock-inconsistency compensator further comprises:
  a reciprocal table of a equalizer coefficient operable to store a reciprocal value of the equalizer coefficient of each subcarrier;
  a limiter operable to limit the reciprocal value of the equalizer coefficient according to a certain threshold;
  a subcarrier selector operable to select a subcarrier-used to compensate for the clock-inconsistency utilizing said reciprocal table of the equalizer coefficient;
  a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
  an average sample-deviation calculator operable to calculate an average sample-deviation of a time signal by using the phase-deviation of each subcarrier and output the average sample-deviation of the time signal; and
  a phase compensator operable to compensate a phase of each subcarrier by using the average sample-deviation of the time signal.

12. The receiver according to claim 1, wherein said clock-inconsistency compensator further comprises:
- a reciprocal table of a equalizer coefficient operable to store a reciprocal value of the equalizer coefficient of each subcarrier;
- a weighted phase-deviation calculator operable to calculate a phase-deviation of each subcarrier, which is caused by the clock-inconsistency between said receiver and the transmitter, by using the decision data, the equalized complex data, and a weight obtained from said reciprocal table of the equalizer coefficient, and output the phase-deviation of each subcarrier;
- an average sample-deviation calculator operable to calculate an average sample-deviation of a time signal by using the phase-deviation of each subcarrier, and output the average sample-deviation of the time signal; and
- a phase compensator operable to compensate a phase of each subcarrier by using the average sample-deviation of the time signal.

13. The receiver according to claim 1, wherein said clock-inconsistency compensator further comprises:
- a phase-difference table operable to store a phase-difference between consecutive complex subcarriers;
- a subcarrier selector operable to select a subcarrier used to compensate for the clock-inconsistency utilizing said phase-difference table;
- a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
- an average sample-deviation calculator operable to calculate an average sample-deviation of a time signal by using the phase-deviation of each subcarrier and output the average sample-deviation of the time signal; and
- a phase compensator operable to compensate a phase of each subcarrier by using the average sample-deviation of the time signal.

14. The receiver according to claim 1, wherein said clock-inconsistency compensator further comprises:
- a phase-difference table operable to store a phase-difference between consecutive complex subcarriers;
- a limiter operable to limit the phase-difference by a certain threshold;
- a subcarrier selector operable to select a subcarrier used to compensate for the clock-inconsistency utilizing said phase-difference table;
- a phase-deviation calculator operable to calculate a phase-deviation of each subcarrier, which is caused by the clock-inconsistency between said receiver and the transmitter, by using the subcarrier selected by said subcarrier selector and the equalized complex data, and output the phase-deviation of each subcarrier;
- an average a sample-deviation calculator operable to calculate an average sample-deviation of a time signal by using the phase-deviation of each subcarrier, and output the average sample-deviation of the time signal; and
- a phase compensator operable to compensate a phase of each subcarrier by using the average sample-deviation of the time signal.

15. The receiver according to claim 1, wherein said clock-inconsistency compensator further comprises:
- a phase-difference table operable to store a phase-difference between consecutive complex subcarriers;
- a weighted phase-deviation calculator operable to calculate a phase-deviation of ca subcarrier, which is caused by the clock-inconsistency between said receiver and the transmitter, by using the decision data, the equalized complex data, and a weight obtained from said phase-difference table, and output the phase-deviation of each subcarrier;
- an average sample-deviation calculator operable to calculate an average sample-deviation of a time signal by using the phase-deviation of each subcarrier, and output the average sample-deviation of the time signal; and
- a phase compensator operable to compensate a phase of each subcarrier by using the average sample-deviation of the time signal.

16. The receiver according to claim 1, wherein said first wavelet transformer and said second wavelet transformer each comprise M real coefficient wavelet filters which are orthogonal with respect to each other (M is a positive integer).

17. The receiver according to claim 1, wherein said first wavelet transformer and said second wavelet transformer each comprise M real coefficient wavelet filters which are orthogonal with respect to each other (M is a positive integer).

18. The receiver according to claim 1, wherein the predetermined lines are respectively parallel with Q-axis of Cartesian coordinates.

19. A receiver employing a digital wavelet multi-carrier demodulation for receiving data transmitted from a transmitter by Pulse Amplitude Modulation, said receiver comprising:
- a first wavelet transforming means for performing a wavelet transform of received data;
- a second wavelet transforming means for performing a wavelet transform of received data, said second wavelet transforming means being orthogonal to said first wavelet transforming means;
- a complex data generating means for generating complex data by defining outputs from said first wavelet transforming means as in-phase components of complex information and outputs from said second wavelet transforming means as orthogonal components of the complex information, and outputting the complex data;
- an equalizing means for equalizing the complex data, and outputting an equalized complex data;
- a clock-inconsistency compensating means for selecting, based on a decision data which exists on the real axis on Cartesian coordinates, a single line among a plurality of predetermined lines, which are parallel to the imaginary axis on Cartesian coordinates, on which the equalized complex data would be distributed if the clock-inconsistency did not exist, replacing an orthogonal component of the equalized complex data with a predetermined value, calculating an angle between the selected line and a line which passes through both the equalized complex data having the predetermined value as the orthogonal component and the decision data, performing compensation of a clock-inconsistency between said receiver and the transmitter by using the angle, and obtaining compensated complex data based on said compensation of said clock inconsistency; and
- said decision means for deciding whether the decision data used in communication corresponds to the compensated complex data in accordance with said Pulse Amplitude Modulation, and outputting the decision data.

20. A method for receiving data from digital multi-carrier transmission by Pulse Amplitude Modulation, said method comprising:
- performing, by a first wavelet transformer, a first wavelet transform of received data and outputting first transformed data;

performing a second wavelet transform of received data and outputting second transformed data;

generating complex data by defining the first transformed data as in-phase components of complex information and the second transformed data as orthogonal components of the complex information and outputting the complex data;

equalizing the complex data, and outputting an equalized complex data;

selecting, based on a decision data which exists on the real axis on Cartesian coordinates, a single line among a plurality of predetermined lines, which are parallel to the imaginary axis on Cartesian coordinates, on which the equalized complex data would be distributed if the clock-inconsistency did not exist;

replacing an orthogonal component of the equalized complex data with a predetermined value;

calculating an angle between the selected line and a line which passes through both the equalized complex data having the predetermined value as the orthogonal component and the decision data;

performing compensation of a clock-inconsistency between said receiver and the transmitter by using the angle;

obtaining compensated complex data based on said compensation of said clock inconsistency; and deciding the decision data based on the compensated complex data, and outputting the decision data.

21. A receiver employing a digital wavelet multi-carrier demodulation for receiving data transmitted from a transmitter by Pulse Amplitude Modulation, said receiver comprising:

a wavelet transformer operable to perform a wavelet transform of received data and operable to output wavelet-transformed data; and a clock-inconsistency compensator operable to select, based on a decision data which exists on the real axis on Cartesian coordinates, a single line among a plurality of predetermined lines, which are parallel to the imaginary axis on Cartesian coordinates, on which the wavelet-transformed data would be distributed if the clock-inconsistency did not exist, replace an orthogonal component of the equalized complex data with a predetermined value, calculate an angle between the selected line and a line which passes through both the equalized complex data having the predetermined value as the orthogonal component and the decision data, perform compensation of a clock-inconsistency between said receiver and the transmitter by using the angle obtain compensated complex data based on said compensation of said clock inconsistency, and output said compensated complex data.

22. The receiver according to claim 21 further comprising:

an equalizer operable to equalize the wavelet-transformed data, and output equalized data, wherein said clock-inconsistency compensator is operable to compensate the clock-inconsistency by using both the equalized complex data and the selected line.

23. The receiver according to claim 21 further comprising:

an equalizer operable to equalize the wavelet-transformed data, and output equalized data; and a decision unit operable to decide whether the decision data used in communication exists, and output the decision data, wherein said clock-inconsistency compensator is operable to compensate the clock-inconsistency by using the decision data and the predetermined line, and operable to output compensated data.

24. A method for receiving data from a digital multi-carrier transmission by Pulse Amplitude Modulation, said method comprising:

performing b a first wavelet transformer, a first wavelet transform of received data and outputting wavelet-transformed data; and selecting, based on a decision data which exists on the real axis on Cartesian coordinates, a single line among a plurality of predetermined lines, which are parallel to the imaginary axis on Cartesian coordinates, on which the equalized complex data would be distributed if the clock-inconsistency did not exist;

replacing an orthogonal component of the equalized complex data with a predetermined value;

calculating an angle between the selected line and a line which passes through both the equalized complex data having the predetermined value as the orthogonal component and the decision data; and compensating a clock-inconsistency between a receiver and a transmitter in accordance with the angle.

* * * * *